(12) United States Patent
Morimoto et al.

(10) Patent No.: US 12,448,638 B2
(45) Date of Patent: Oct. 21, 2025

(54) ENZYME BASED SYSTEM FOR PRODUCTION OF MESSENGER RNA WITH INCREASED TRANSFECTION EFFICIENCY

(71) Applicant: ImmunityBio, Inc., Culver City, CA (US)

(72) Inventors: Brett Morimoto, Culver City, CA (US); Kayvan Niazi, Culver City, CA (US); Annie Shin, Culver City, CA (US); Lise Geissert, Culver City, CA (US); Philip T. Liu, Culver City, CA (US)

(73) Assignee: ImmunityBio, Inc., San Diego, CA (US)

( * ) Notice: Subject to any disclaimer, the term of this patent is extended or adjusted under 35 U.S.C. 154(b) by 638 days.

(21) Appl. No.: 17/931,352

(22) Filed: Sep. 12, 2022

(65) Prior Publication Data

US 2023/0183770 A1 Jun. 15, 2023

Related U.S. Application Data

(60) Provisional application No. 63/244,990, filed on Sep. 16, 2021.

(51) Int. Cl.
*C12P 19/34* (2006.01)
*C12N 9/12* (2006.01)
*C12N 15/70* (2006.01)

(52) U.S. Cl.
CPC ............ *C12P 19/34* (2013.01); *C12N 9/1241* (2013.01); *C12N 9/1247* (2013.01); *C12Y 207/07019* (2013.01)

(58) Field of Classification Search
None
See application file for complete search history.

(56) References Cited

FOREIGN PATENT DOCUMENTS

| WO | WO 2014/152027 | 9/2014 |
| WO | WO 2020/205793 | 10/2020 |
| WO | WO 2020/243026 | 12/2020 |

OTHER PUBLICATIONS

Cao et al., "Identification of the coding region for a second poly(A) polymerase in *Escherichia coli*," Proceedings of the National Academy of Sciences, Oct. 1, 19965, vol. 93(21), pp. 11580-11585.
Takahashi et al., "Quick and Easy Assembly of a One-Step qRT-PCR Kit for COVID-19 Diagnostics Using In-House Enzymes," ACS Omega, Mar. 23, 2021, vol. 6(11), pp. 7374-7386.
International Search Report and Written Opinion for International (PCT) Patent Application No. PCT/US2022/076290, dated Dec. 27, 2022 11 pages.
International Preliminary Report on Patentability for International (PCT) Patent Application No. PCT/US2022/076290, dated Mar. 28, 2024 6 pages.
Beck et al., "mRNA therapeutics in cancer immunotherapy," Molecular Cancer, 2021, vol. 20:69, 24 pages.
Cao et al., "Identification of the gene for an *Escherichia coli* poly(A) polymerase," Proceedings of the National Academy of Sciences (PNAS), Nov. 1992, vol. 89, pp. 10380-10384.
Gao et al., "Synthetic modified messenger RNA for terapeutic applications," Acta Biomaterialia, 2021, retrieved from https://doi.org/10.1016/j.actbio.2021.06.020, 16 pages.
Hornblower et al., "Minding your caps and tails," New England BioLabs, White Paper, (2015), 5 pages.
Jackson et al., "The promise of mRNA vaccines: a biotech and industrial perspective," npj/Vaccines, 2020, vol. 5(11), 6 pages.
Ramanathan et al., "Survey and Summary, mRNA capping: biological functions and applications," Nucleic Acids Research, 2016, vol. 44(16), pp. 7511-7526.
Sadarangani et al., "Immunological mechanisms of vaccine-induced protection against COVID-19 in humans," Progress, Nature Reviews/Immunology, Jul. 1, 2021, 10 pages.
Sahin et al., "mRNA-based therapeutics-developing a new class of drugs," Nature Reviews/Drug Discovery, Oct. 2014, vol. 13, pp. 759-780.
Schlake et al., "mRNA as novel technology for passive immunotherapy," Cellular and Molecular Life Sciences, 2019 (pub online Oct. 17, 2018), vol. 76, pp. 301-328.
Wang et al., "mRNA vaccine: a potential therapeutic strategy," Molecular Cancer, 2021, vol. 20:33, 23 pages.

*Primary Examiner* — Manjunath N Rao
*Assistant Examiner* — Jae W Lee
(74) *Attorney, Agent, or Firm* — Sheridan Ross P.C.

(57) ABSTRACT

A method for the production of proteins used in the in vitro transcription (IVT) of messenger RNA (mRNA), wherein the proteins are evaluated for purity and efficacy by the efficiency with which mRNA synthetically derived therefrom, subsequently transfects cells and produces encoded proteins.

7 Claims, 19 Drawing Sheets

Specification includes a Sequence Listing.

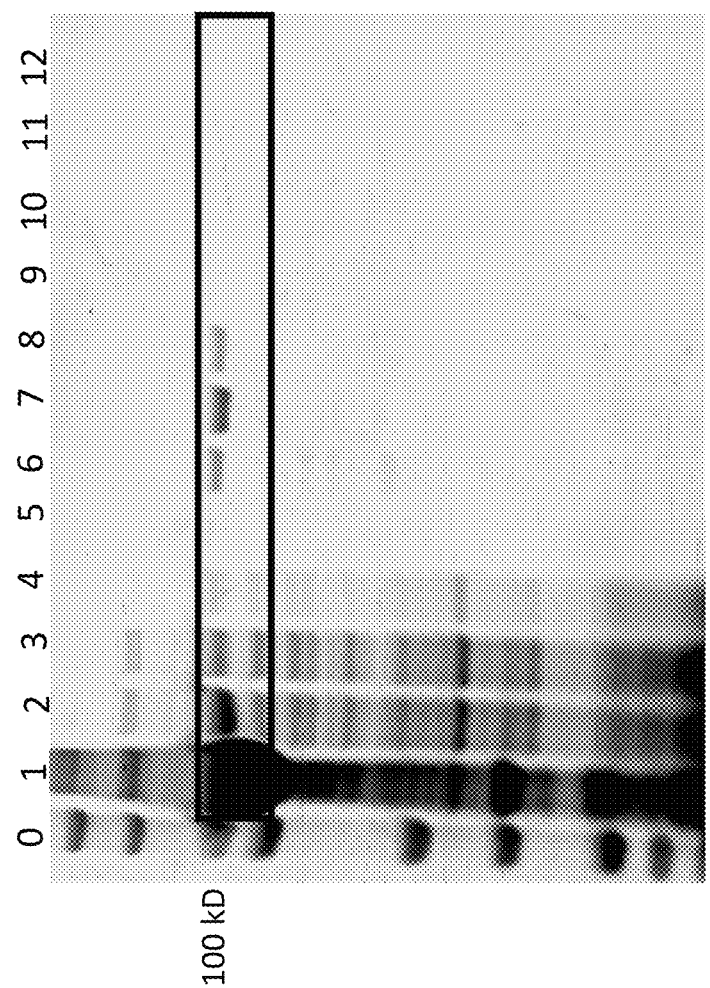

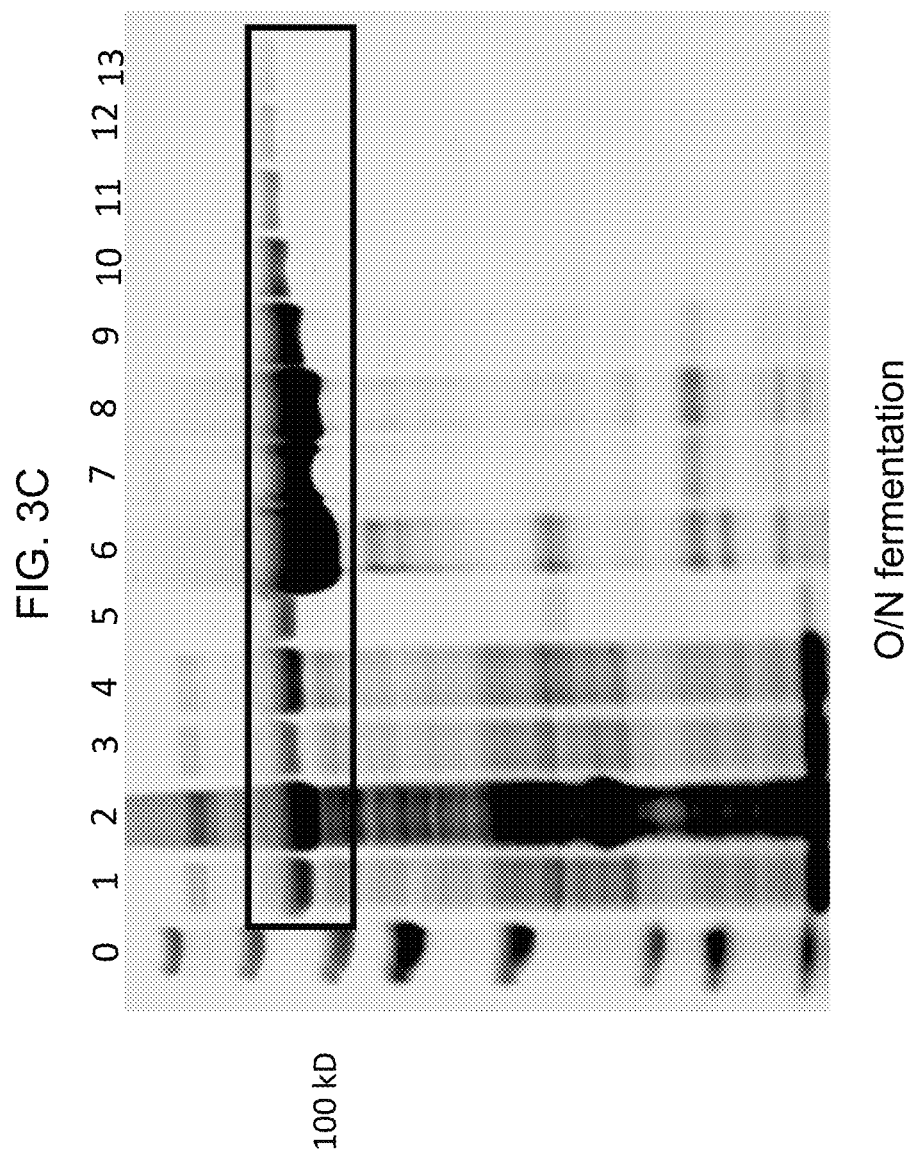

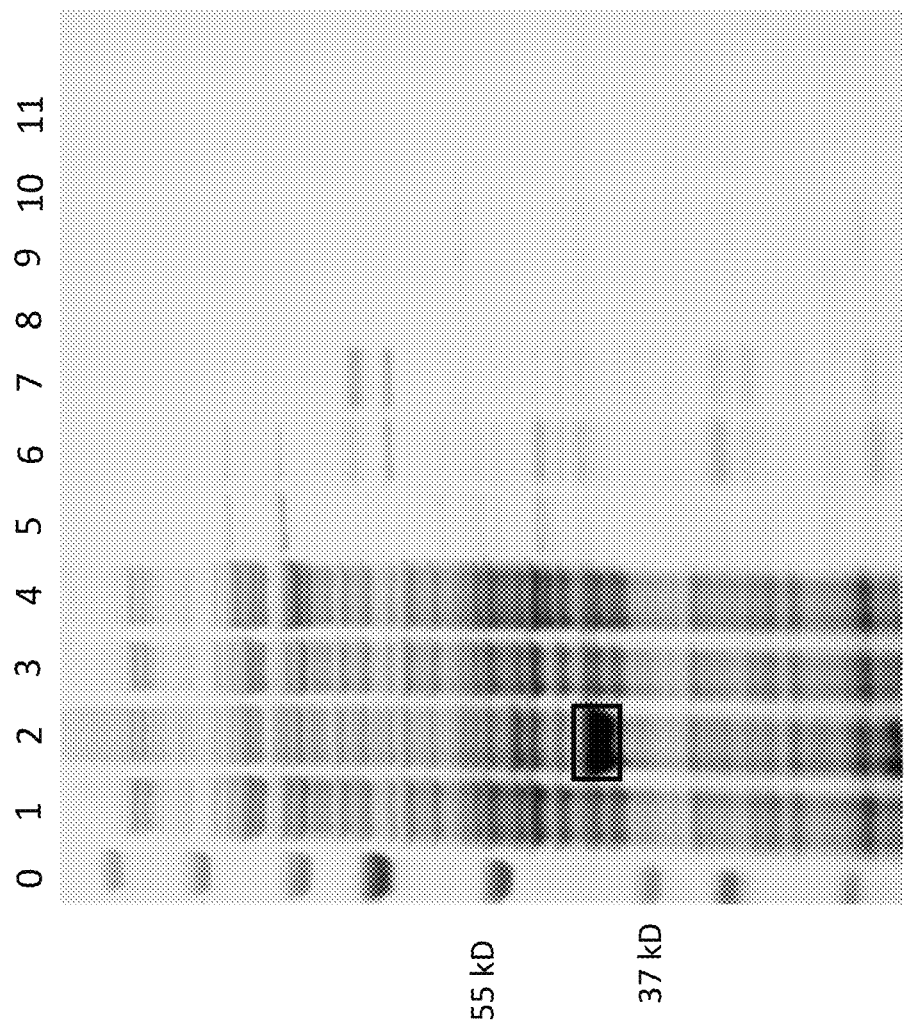

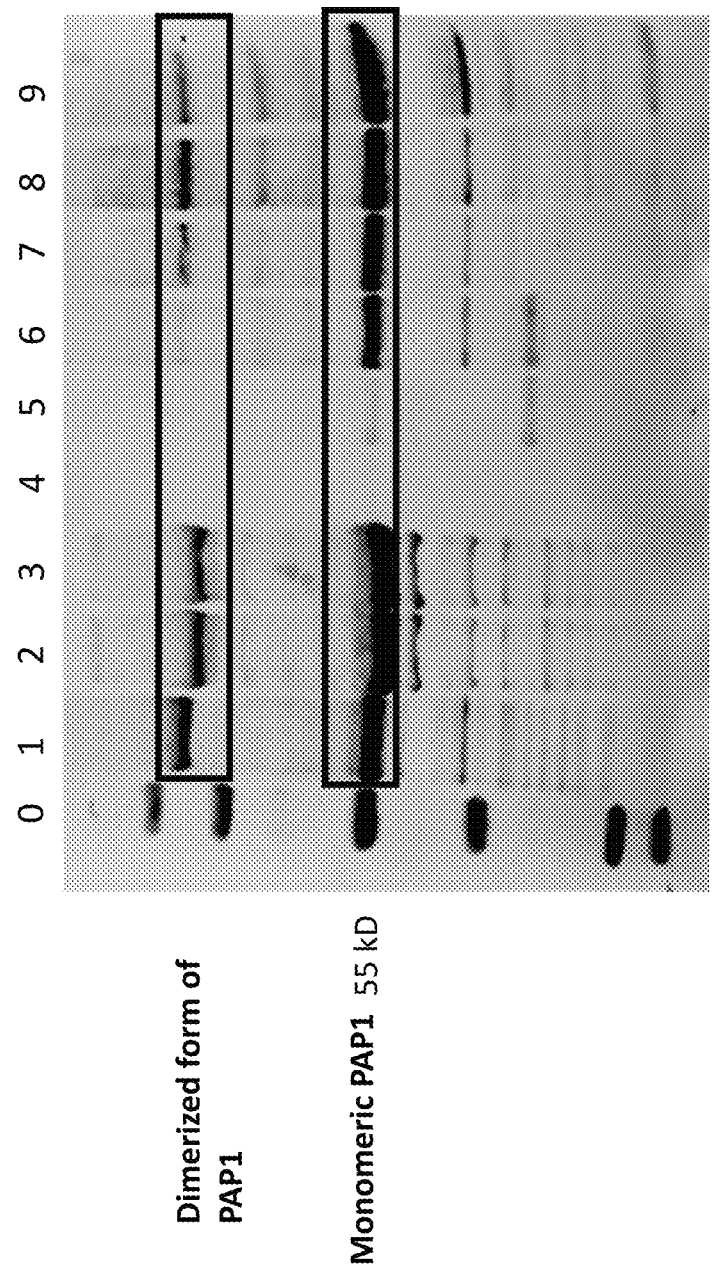

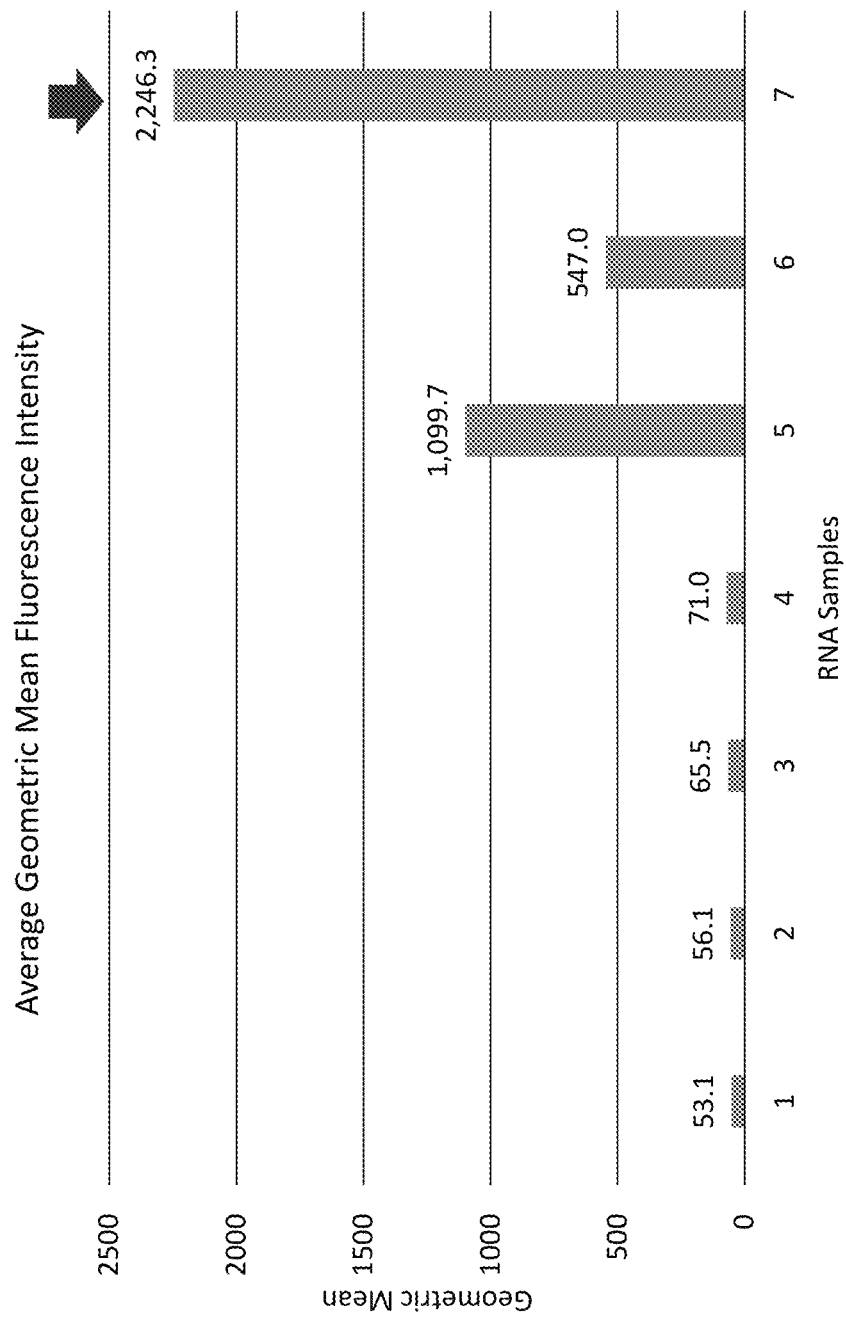

SEQUENCE LISTING

```
Sequence total quantity: 26
SEQ ID NO: 1            moltype = DNA  length = 26
FEATURE                 Location/Qualifiers
source                  1..26
                        mol_type = other DNA
                        organism = synthetic construct
SEQUENCE: 1
ataatgtgcc tgtcaaatgg acgaag                                    26

SEQ ID NO: 2            moltype = DNA  length = 25
FEATURE                 Location/Qualifiers
source                  1..25
                        mol_type = other DNA
                        organism = synthetic construct
SEQUENCE: 2
ctagcccaaa aaaacgggta tggag                                     25

SEQ ID NO: 3            moltype = DNA  length = 60
FEATURE                 Location/Qualifiers
source                  1..60
                        mol_type = other DNA
                        organism = synthetic construct
SEQUENCE: 3
```

```
ccacgatgcg tccggcgtag aggatcgaga tctataatgt gcctgtcaaa tggacgaagc    60

SEQ ID NO: 4           moltype = DNA   length = 56
FEATURE                Location/Qualifiers
source                 1..56
                       mol_type = other DNA
                       organism = synthetic construct
SEQUENCE: 4
cttcttaaag ttaaacaaaa ttatttctag actagcccaa aaaaacgggt atggag        56

SEQ ID NO: 5           moltype = DNA   length = 60
FEATURE                Location/Qualifiers
source                 1..60
                       mol_type = other DNA
                       organism = synthetic construct
SEQUENCE: 5
gtttaacttt aagaaggaga tatattcgaa atgcatcacc atcaccatca cgctagcatg    60

SEQ ID NO: 6           moltype = DNA   length = 59
FEATURE                Location/Qualifiers
source                 1..59
                       mol_type = other DNA
                       organism = synthetic construct
SEQUENCE: 6
cgaattcgga tccgaattaa ttccgatatc catggttacg cgaacgcgaa gtccgactc     59

SEQ ID NO: 7           moltype = DNA   length = 59
FEATURE                Location/Qualifiers
source                 1..59
                       mol_type = other DNA
                       organism = synthetic construct
SEQUENCE: 7
ggatcgagat cgatctcgat cccgcgaaat ataatgtgcc tgtcaaatgg acgaagcag     59

SEQ ID NO: 8           moltype = DNA   length = 65
FEATURE                Location/Qualifiers
source                 1..65
                       mol_type = other DNA
                       organism = synthetic construct
SEQUENCE: 8
ctccttctta aagttaaaca aaattatttc tagactagcc caaaaaaacg ggtatggaga    60
aacag                                                                65

SEQ ID NO: 9           moltype = DNA   length = 63
FEATURE                Location/Qualifiers
source                 1..63
                       mol_type = other DNA
                       organism = synthetic construct
SEQUENCE: 9
gcttaagtcg aacagaaagt aatcgtattg tacaataatg tgcctgtcaa atggacgaag    60
cag                                                                  63

SEQ ID NO: 10          moltype = DNA   length = 76
FEATURE                Location/Qualifiers
source                 1..76
                       mol_type = other DNA
                       organism = synthetic construct
SEQUENCE: 10
catatgtata tctccttctt atacttaact aatatactaa gatggctagc ccaaaaaaac    60
gggtatggag aaacag                                                    76

SEQ ID NO: 11          moltype = DNA   length = 57
FEATURE                Location/Qualifiers
source                 1..57
                       mol_type = other DNA
                       organism = synthetic construct
SEQUENCE: 11
gtatattagt taagtataag aaggagatat acaatggacg agattgttaa aaacatt       57

SEQ ID NO: 12          moltype = DNA   length = 57
FEATURE                Location/Qualifiers
source                 1..57
                       mol_type = other DNA
                       organism = synthetic construct
SEQUENCE: 12
gtggccggcc gatatccaat tgagatctgc cattacagta ataatttcac caggcga       57

SEQ ID NO: 13          moltype = DNA   length = 57
FEATURE                Location/Qualifiers
```

```
source                  1..57
                        mol_type = other DNA
                        organism = synthetic construct
SEQUENCE: 13
gaaataattt tgtttaactt taagaaggag atatacatga aacaccatca ccatcac         57

SEQ ID NO: 14           moltype = DNA   length = 57
FEATURE                 Location/Qualifiers
source                  1..57
                        mol_type = other DNA
                        organism = synthetic construct
SEQUENCE: 14
cgacctgcag gcgcgccgag ctcgaattcg ttaacgtttc gagaacacgt agacaac         57

SEQ ID NO: 15           moltype = DNA   length = 29
FEATURE                 Location/Qualifiers
source                  1..29
                        mol_type = other DNA
                        organism = synthetic construct
SEQUENCE: 15
tgacactacc gaggtgtact attttttacc                                       29

SEQ ID NO: 16           moltype = DNA   length = 18
FEATURE                 Location/Qualifiers
source                  1..18
                        mol_type = other DNA
                        organism = synthetic construct
SEQUENCE: 16
tgcggtaccc tcacgacg                                                    18

SEQ ID NO: 17           moltype = DNA   length = 67
FEATURE                 Location/Qualifiers
source                  1..67
                        mol_type = other DNA
                        organism = synthetic construct
SEQUENCE: 17
gaaataattt tgtttaactt taagaaggag atatacattg acactaccga ggtgtactat      60
ttttacc                                                                67

SEQ ID NO: 18           moltype = DNA   length = 71
FEATURE                 Location/Qualifiers
source                  1..71
                        mol_type = other DNA
                        organism = synthetic construct
SEQUENCE: 18
ctcgaattcg gatccgaatt aattccgata tctcagtggt gatggtgatg gtgtgcggta      60
ccctcacgac g                                                           71

SEQ ID NO: 19           moltype = DNA   length = 9347
FEATURE                 Location/Qualifiers
source                  1..9347
                        mol_type = other DNA
                        organism = synthetic construct
SEQUENCE: 19
tggcgaatgg gacgcgccct gtagcggcgc attaagcgcg gcgggtgtgg tggttacgcg      60
cagcgtgacc gctacacttg ccagcgccct agcgcccgct cctttcgctt tcttcccttc     120
ctttctcgcc acgttcgccg gctttccccg tcaagctcta atcggggggc tccctttagg     180
gttccgattt agtgctttac ggcacctcga ccccaaaaaa cttgattagg gtgatggttc     240
acgtagtggg ccatcgccct gatagacggt ttttcgccct ttgacgttgg agtccacgtt     300
ctttaatagt ggactcttgt tccaaactgg aacaacactc aaccctatct cggtctattc     360
ttttgattta agggattt tgccgatttc ggcctattgg ttaaaaaatg agctgattta      420
acaaaaattt aacgcgaatt ttaacaaaat attaacgttt acaatttcag gtggcacttt     480
tcggggaaat gtgcgcggaa cccctatttg tttatttttc taaatacatt caaatatgta     540
tccgctcatg agacaataac cctgataaat gcttcaataa tattgaaaaa ggaagagtat     600
gagtattcaa catttccgtg tcgcccttat tccctttttt gcggcatttt gccttcctgt     660
ttttgctcac ccagaaacgc tggtgaaagt aaaagatgct gaagatcagt tgggtgcacg     720
agtgggttac atcgaactgg atctcaacag cggtaagatc cttgagagtt ttcgccccga     780
agaacgtttt ccaatgatga gcacttttaa agttctgcta tgtggcgcgg tattatcccg     840
tattgacgcc gggcaagagc aactcggtcg ccgcatacac tattctcaga atgacttggt     900
tgagtactca ccagtcacag aaaagcatct tacggatggc atgacagtaa gagaattatg     960
cagtgctgcc ataaccatga gtgataacac tgcggccaac ttacttctga caacgatcgg    1020
aggaccgaag gagctaaccg cttttttgca acatggggg atcatgtaa ctcgccttga    1080
tcgttgggaa ccggagctga atgaagccat accaaacgac gagcgtgaca ccacgatgcc    1140
tgcagcaatg gcaacaacgt tgcgcaaact attaactggc gaactactta ctctagcttc    1200
ccggcaacaa ttaatagact ggatggaggc ggataaagtt gcaggaccac ttctgcgctc    1260
ggcccttccg gctggctggt ttattgctga taaatctgga gccggtgagc gtgggtctcg    1320
cggtatcatt gcagcactgg ggccagatgg taagccctcc cgtatcgtag ttatctacac    1380
gacggggagt caggcaacta tggatgaacg aaatagacag atcgctgaga taggtgcctc    1440
actgattaag cattggtaac tgtcagacca agtttactca tatatacttt agattgattt    1500
```

```
aaaacttcat ttttaattta aaaggatcta ggtgaagatc cttttttgata atctcatgac   1560
caaaatccct taacgtgagt tttcgttcca ctgagcgtca gacccgtag aaaagatcaa    1620
aggatcttct tgagatcctt tttttctgcg cgtaatctgc tgcttgcaaa caaaaaaacc   1680
accgctacca gcggtggttt gtttgccgga tcaagagcta ccaactcttt ttccgaaggt   1740
aactggcttc agcagagcgc agataccaaa tactgtcctt ctagtgtagc cgtagttagg   1800
ccaccacttc aagaactctg tagcaccgcc tacataccc gctctgctaa tcctgttacc    1860
agtggctgct gccagtggcg ataagtcgtg tcttaccggg ttggactcaa gacgatagtt   1920
accgataaag cgcagcggt cgggctgaac gggggggttcg tgcacacagc ccagcttgga   1980
gcgaacgacc tacaccgaac tgagatacct acagcgtgag ctatgagaaa gcgccacgct   2040
tcccgaaggg agaaaggcgg acaggtatcc ggtaagcggc agggtcggaa caggagagcg   2100
cacgagggag cttccagggg gaaacgcctg gtatctttat agtcctgtcg ggtttcgcca   2160
cctctgactt gagcgtcgat ttttgtgatg ctcgtcaggg gggcggagcc tatgaaaaaa   2220
cgccagcaac gcggccttt tacggttcct ggccttttgc tggccttttg ctcacatgtt    2280
ctttcctgcg ttatccctg attctgtgga taaccgtatt accgcctttg agtgagctga   2340
taccgctcgc cgcagccgaa cgaccgagcg cagcgagtga gtgagcgagg aagcggaaga   2400
gcgcctgatg cggtattttc tccttacgca tctgtgcggt atttcacacc gcatatatgg   2460
tgcactctca gtacaatctg ctctgatgcc gcatagttaa gccagtatac actccgctat   2520
cgctacgtga ctgggtcatg gctgcgcccc gacacccgcc aacacccgct gacgcgccct   2580
gacgggcttg tctgctcccg gcatccgctt acagacaagc tgtgaccgtc tccgggagct   2640
gcatgtgtca gaggttttca ccgtcatcac cgaaacgcgc gaggcagctg cggtaaagct   2700
catcagcgtg gtcgtgaagc gattcacaga tgtctgcctg ttcatccgcg tccagctcgt   2760
tgagtttctc cagaagcgtt aatgtctggc ttctgataaa gcgggccatg ttaagggcgg   2820
ttttttcctg tttggtcact gatgcctccg tgtaagggg atttctgttc atggggtaa    2880
tgataccgat gaaacgagag aggatgctca cgatacgggt tactgatgat gaacatgccc   2940
ggttactgga acgttgtgag ggtaaacaac tggcggtatg gatgcggcgg accagaaa    3000
aaatcactca gggtcaatgc cagcgcttcg ttaatacaga tgtaggtgtt ccacaggta    3060
gccagcagca tcctgcgatg cagatccgga acataatggt gcagggcgct gacttccgga   3120
tttccagact ttacgaaaca cggaaaccga agaccattca tgttgttgct caggtcgcag   3180
acgttttgca gcagcagtcg cttcacgttc gctcgcgtat cggtgattca ttctgctaac   3240
cagtaaggca aaccccgcca g cctagccggg tcctcaacga caggagcacg atcatgcga   3300
cccgtggggc cgccatgccg gcgataatgg cctgcttctc gccgaaacgt ttggtggcgg   3360
gaccagtgac gaaggcttga gcgagggcgt gcaagattcc gaataccgca agcgacaggc   3420
cgatcatcgt cgcgctccag cgaaagcggt cctcgccgaa aatgacccag agcgctgccg   3480
gcacctgtcc tacgagttgc atgataaaga agacagtcat aagtgcggcg acgatagtcga  3540
tgccccgcgc ccaccggaag gagctgactg ggttgaaggc tctcaagggc atcggtcgag   3600
atcccggtgc ctaatgagtg agctaactta cattaattgc gttgcgctca ctgcccgctt   3660
tccagtcggg aaacctgtcg tgccagctgc attaatgaat cggccaacgc gcggggagag   3720
gcggtttgcg tattgggcgc cagggtggtt tttcttttca ccagtgagac gggcaacagc   3780
tgattgccct tcaccgcctg gccctgagag agttgcagca agcggtccac gctggtttgc   3840
cccagcaggc gaaaatcctg tttgatggtg gttaacggcg ggatataaca tgagctgtct   3900
tcggtatcgt cgtatcccac taccgagata tccgcaccaa cgcgcagccc ggactcggta   3960
atggcgcgca ttgcgcccag cgccatctga tcgttggcaa ccagcatcgc agtgggaacg   4020
atgccctcat tcagcatttg catggtttgt tgaaaaccgg acatggcact ccagtcgcct   4080
tcccgttccg ctatcggctg aatttgattg cgagtgagat atttatgcca gccagcagaa   4140
cgcagacgcg ccgagacaga acttaatggg cccgctaaca gcgcgatttg ctggtgaccc   4200
aatgcgacca gatgctccac gcccagtcgc gtaccgtctt catgggagaa aataatactg   4260
ttgatggtg tctggtcaga gacatcaaga ataacgccg gaacattagt gcaggcagct    4320
tccacagcaa tggcatcctg gtcatccagc ggatagttaa tgatcagccc actgacgcgt   4380
tgcgcgagaa gattgtgcac cgccgcttta caggcttcga cgccgcttcg ttctaccatc   4440
gacaccacca cgctggcacc cagttgatcg gcgcgagatt taatcgccgc gacaatttgc   4500
gacggcgcgt gcagggccaa actgaggtg gcaacgccaa tcagcaacga ctgtttgccc    4560
gccagttgtt gtgccacgcg gttgggaatg taattcagct ccgccatcgc cgcttccact   4620
ttttcccgcg ttttcgcaga aacgtggctg gcctggttca ccacgcggga aacggtctga   4680
taagagacac cggcatactc tgcgacatcg tataacgtta ctggtttcac attcaccacc   4740
ctgaattgac tctcttccgg gcgctatcat gccataccgc gaaaggtttt gcgccattcg   4800
atggtgtccg ggatctcgac gctctcccct tatgcgactcc tgcattagga agcagcccag   4860
tagtaggttg aggccgttga gcaccgccgc gcaaggaat ggtgcatgca aggagatggc    4920
gcccaacagt cccccggcca cggggcctgc caccataccc acgccgaaac aagcgctcat   4980
gagcccgaag tggcgagccc gatcttcccc atcggtgatg tcggcgatat aggcgccagc   5040
aaccgcacct gtggcgccgg tgatgccggc cacgatgcgt ccggcgtaga ggatcgagat   5100
ctataatgtg cctgtcaaat ggacgaagca gggattctgc aaaccctatg ctactccgtc   5160
aagccgtcaa ttgtctgatt cgttaccaat tatgacaact tgacggctac atcattcact   5220
ttttcttcac aaccggcacg gaactcgctc gggctggccc cggtgcattt tttaaatacc   5280
cgcgagaaat agagttgatc gtcaaaacca acattgcgaa cggttgc gataggcatc     5340
cgggtggtgc tcaaaagcag cttcgcctgg ctgatacgtt ggtcctgcgc ccagcttaag   5400
acgctaatcc ctaactgctg gcggaaaaga tgtgacagac gcgacggcga caagcaaaca   5460
tgctgtgcga cgctggcgat atcaaaattg ctgtctgcca ggtgatcgct gatgtactga   5520
caagcctcgc gtacccgatt atccatcggt ggatggagcg actgcgttaat cgcttccatg   5580
cgccgcagta acaattgctc aagcagattt atcgccagca gctccgaata gcgcccttcc   5640
ccttgccccgg cgttaatgat tgcccaaac aggtcgctga aatgcggctg gtgcgcttca    5700
tccgggcgaa agaaccccgt attggcaaat attgacggcc agttaagcca ttcatgccag   5760
taggcgcgcg gacgaaagta aacccactgg tgataccatt cgcgagcctc cggatgacga   5820
ccgtagtgat gaatctctcc tggcgggaac agcaaaatat caccggtcg gcaaacaaat   5880
tctcgtccct gatttttcac caccccctga tcgcgaatgg tgagttgag aataatccat   5940
ttcattccca gcggtcggtc gataaaaaaa tcgagataac cgttggcctc aatcggcgtt   6000
aaacccgcca ccagatgggc attaaacgag tatcccggca gcaggggatc attttgcgct   6060
tcagccatac ttttcatact cccgccattc agagaagaaa ccaattgtcc atattgcatc   6120
agacattgcc gtcactgcgt ctttttactgg ctcttctcgc taaccaaacc ggtaacccg    6180
cttattaaaa gcattctgta acaaagcggg accaaagcca tgacaaaaac gcgtaacaaa   6240
```

```
agtgtctata atcacggcag aaaagtccac attgattatt tgcacggcgt cacactttgc  6300
tatgccatag cattttatc cataagatta gcggatccta cctgacgctt tttatcgcaa   6360
ctctctactg tttctccata cccgtttttt tgggctagtc tagaaataat tttgtttaac  6420
tttaagaagg agatatattc gaaatgcatc accatcacca tcacgctagc atgaacacga  6480
ttaacatcgc taagaacgac ttctctgaca tcgaactggc tgctatccg ttcaacactc   6540
tggctgacca ttacggtgag cgtttagctc gcgaacagtt ggcccttgag catgagtctt  6600
acgagatggg tgaagcacgc ttccgcaaga tgtttgagcg tcaacttaaa gctggtgagg  6660
ttgcggataa cgctgccgcc aagcctctca tcactaccct actccctaag atgattgcac  6720
gcatcaacga ctggtttgag gaagtgaaag ctaagcgcgg caagcgcccg acagccttcc  6780
agttcctgca agaaatcaag ccggaagccg tagcgtacat caccattaag accactctgg  6840
cttgcctaac cagtgctgac aatacaaccg ttcaggctgt agcaagcgca atcggtcggg  6900
ccattgagga cgaggctcgc ttcggtcgta tccgtgacct tgaagctaag cacttcaaga  6960
aaaacgttga ggaacaactc aacaagcgcg tagggcacgt ctacaagaaa gcatttatgc  7020
aagttgtcga ggctgacatg ctctctaagg tgtctactgg tggcgaggcg tggtcttcgt  7080
ggcataagga agactctatt catgtaggag tacgctgcat cgagatgctc attgagtcaa  7140
ccggaatggt tagcttacac cgccaaaatg ctggcgtagt aggtcaagac tctgagacta  7200
tcgaactcgc acctgaatac gctgaggcta tcgcaacccg tgcaggtgcg ctggctggca  7260
tctctccgat gttccaacct tgcgtagttc ctcctaaggc gtggactggc attactggtg  7320
gtggctattg ggctaacggt cgtcgtcctc tggcgctggt gcgtactcac agtaagaaag  7380
cactgatgcg ctacgaagac gtttacatgc ctgaggtgta caaagcgatt aacattgcgc  7440
aaaacaccgc atggaaaatc aacaagaaag tcctagcggt cgccaacgta atcaccaagt  7500
ggaagcattg tccggtcgag gacatccctg cgattgagcg tgaagaactc gcgatgaaac  7560
cggaagacat cgacatgaat cctgaggctc tcaccgcgtg gaaacgtgct gccgctgctg  7620
tgtaccgcaa ggacaaggct cgcaagtctc gccgtatcag ccttgagttc atgcttgagc  7680
aagccaataa gtttgctaac cataaggcca tctggttccc ttacaacatg gactggcgcg  7740
gtcgtgttta cgctgtgtca atgttcaacc cgcaaggtaa cgatatgacc aaaggactgc  7800
ttacgctggc gaaaggtaaa ccaatcggta aggaaggtta ctactggctg aaaatccacg  7860
gtgcaaactg tgccgggtgt cgataaggttc cgttccctga gcgcatcaag ttcattgagg  7920
aaaaccacga gaacatcatg gcttgcgcta gtctccact ggagaacact tggtgggctg    7980
agcaagattc tccgttctgc ttccttgcgt tctgctttga gtacgctggg gtacagcacc  8040
acggcctgag ctataactgc tcccttccgc tggcgtttga cgggtcttgc tctggcatcc  8100
agcacttctc cgcgatgctc cgagatgagg taggtggtcg cgcggttaac ttgcttccta  8160
gtgaaaccgt tcaggacatc tacgggattg ttgctaagaa agtcaacgag attctacaag  8220
cagacgcaat caatgggacc gataacgaag tagttaccgt gaccgatgag aacactggtg  8280
aaatctctga gaaagtcaag ctgggcacta aggcactggc tggtcaatgg ctggcttacg  8340
gtgttactcg cagtgtgact aagcgttcag tcatgacgct ggcttacggg tccaaagagt  8400
tcggcttccg tcaacaagtg ctggaagata ccattcagcc agctattgat tccggcaagg  8460
gtctgatgtt cactcagccg aatcaggctg ctggatacat ggctaagctg atttgggaat  8520
ctgtgagcgt gacggtggta gctgcggttg aagcaatgaa ctggcttaag tctgctgcta  8580
agctctggc tgctgaggtc aaagataaga agactggaga gattcttcgc aagcgttgcg    8640
ctgtgcattg ggtaactcct gatggtttcc ctgtgtggca ggaatacaag aagcctattc  8700
agacgcgctt gaacctgatg ttcctcggtc agttccgctt acagcctacc attaaccacca 8760
acaaagatag cgagattgat gcacacaaac aggagtctgg tatcgctcct aactttgtac  8820
acagccaaga cggtagccac cttcgtaaga ctgtagtgtg ggcacacgag aagtacggaa  8880
tcgaatcttt tgcactgatt cacgactcct tcggtaccat tccggctgac gctgcgaacc  8940
tgttcaaagc agtgcgcgaa actatggttg acacatatga gtcttgtgat gtactggctg  9000
atttctacga ccagttcgct gaccagttgc acgagtctca atttgacaaa atgccagcac  9060
ttccggctaa aggtaacttg aacctccgtg acattctaga gtcggacttc gcgttcgcgt  9120
aaccatggat atcggaatta attcggatcc gaattcgagc tccgtcgaca agcttcgcgc  9180
cgcactcgag caccaccacc accaccactg agatccggct gctaacaaag cccgaaagga  9240
agctgagttg gctgctgcca ccgctgagca ataactagca taaccccttg gggcctctaa  9300
acgggtcttg aggggttttt tgctgaaagg aggaactata tccggat                9347
```

| SEQ ID NO: 20 | moltype = DNA   length = 11338 |
|---|---|
| FEATURE | Location/Qualifiers |
| source | 1..11338 |
| | mol_type = other DNA |
| | organism = synthetic construct |

SEQUENCE: 20

```
attcaccacc ctgaattgac tctcttccgg gcgctatcat gccataccgc gaaaggtttt   60
gcgccattcg atggtgtccg ggatctcgac gctctccctt atgcgactcc tgcattagga  120
agcagcccca tagtaggttg aggccgttga gcaccgccgc gcaaggaat ggtgcatgca    180
aggagatggc gcccaacagt cccccggcca cggggcctgc caccatacc acgccgaaac   240
aagcgctcat gagcccgaag tggcgagccc gatcttcccc atcggtgatg tcggcgatat  300
aggcgccagc aaccgcacct gtggcgccgg tgatgccgac cacgatgcgt ccggcgtaga  360
ggatcgagat cgatctcgat cccggcgaaat ataatgtgcc tgtcaaatgg acgaagcagg  420
gattctgcaa accctatgct actccgtcaa gccgtcaatt gtctgattcg ttaccaatta  480
tgacaacttg acggctacat cattcacttt tccttcacca ccggcacgga actcgctcgg  540
gctggccccg gtgcatttt taaatacccg cgagaaatag agttgatcgt caaaaccaac  600
attgcgaccg acgtggcgat aggcatccg ggtggtgctc aaaagcagct tcgcctggct   660
gatacgttgg tcctcgcgcc agcttaagac gctaatccct aactgctggc ggaaaagatg  720
tgacagacgc gacggcgaca agcaaacatg ctgtgcgacg ctggcgatat caaaattgct  780
gtctgccagg tgatcgctga tgtactgaca agcctcgcgt accgattat ccatcggtgg   840
atggagcgac tcgttaatcg cttccatgcg ccgcagtaac aattgctcaa gcagatttat  900
cgccagcagc tccgaatagc gcccttcccc ttgcccggcg ttaatgattt gcccaaacag  960
gtcgctgaaa tgcggctggt gcgcttcatc cgggcgaaag aacccgtat tggcaaatat   1020
tgacggccaa ttaagccatt catgccagta ggcgcgcgga cgaaagtaaa cccactggtg  1080
ataccattcg cgagcctccg gatgacgacc gtagtgatga atctcctg gcgggaacag    1140
caaaatatca cccggtcggc aaacaaattc tcgtccctga tttttcacca ccccctgacc  1200
```

```
gcgaatggtg agattgagaa tataacctttt cattcccagc ggtcggtcga taaaaaaatc  1260
gagataaccg ttggcctcaa tcggcgttaa acccgccacc agatgggcat taaacgagta  1320
tcccggcagc aggggatcat tttgcgcttc agccatactt ttcatactcc cgccattcag  1380
agaagaaacc aattgtccat attgcatcag acattgccgt cactgcgtct tttactggct  1440
cttctcgcta accaaaacgg taaccccgct tattaaaagc attctgtaac aaagcgggac  1500
caaagccatg acaaaaacgc gtaacaaaag tgtctataat cacggcagaa aagtccacat  1560
tgattatttg cacggcgtca cactttgcta tgccatagca ttttttatcca taagattagc  1620
ggatcctacc tgacgctttt tatcgcaact ctctactgtt tctccatacc cgttttttg   1680
ggctagtcta gaaataattt tgtttaactt taagaaggag atatacatga aacaccatca  1740
ccatcaccac cccatgtcag actacgatat cccaaccact gaaaacttat acttccaagg  1800
ggcaatggac gcaaacgtcg taagcagttc taccattgcg acctacattg acgcactggc  1860
aaaaaatgca tcggaattag agcagcgctc taccgcctat gaaattaaca atgagttaga  1920
attagttttt attaagcctc cgttaattac cttaaccaat gtagtcaata ttagtactat  1980
tcaagagtct ttcatccgtt tcactgtaac taacaaggaa gggtgaagga tccgcacgaa  2040
gattccattg tcgaaagtac acggacttga tgtaaagaac gttcaattgg tagatgcaat  2100
tgacaatatt gtatgggaaa aaagtctct   tgtgaccgaa aaccgtttac ataaagagtg  2160
tctgctgcgt ttatctacgg aggagcgcca catcttttg   gattacaaga aatacggatc  2220
ttctatccgt ctggaattgg tcaacttaat tcaggccaag actaaaaatt tcacaattga  2280
tttcaaatta aaatacttttt tgggctcagg tgcgcagtct aagtcgagct tattgcatgc  2340
tatcaaccat ccgaaaagtc gccccaacac ctctctggag attgagttta cgccacgcga  2400
taacgagaca gtgccgtatg acgaattaat taaagaattg accacgttaa gccgccatat  2460
tttcatggcg tcgccagaga atgttatcct tagtccccca attaatgcgc caattaagac  2520
cttcatgtta cccaagcaag acatcgtggg tctggactta gagaacttgt acgcagtcac  2580
caaaacggat ggtattccaa tcactattcg cgtaaccagt aacggacttt attgctactt  2640
cacgcatctg ggttacatca ttcgttaccc ggttaaacgt atcatcgatt ctgaggtcgt  2700
ggtattcggc gaggcagtga aagataaaaa ctggactgta taccttatta aacttatcga  2760
gccggtaaat gcgattaatg atcgtttaga agaaagcaag tatgctggaat ctaagccttgt 2820
cgatatctgt gatcgtatcg tgttcaagtc gaaaaagtat gagggggccct tcaccactac  2880
tagtgaggta gtagatatgc ttagtacgta tttgccaaaa caaccagaag gtgtcattct  2940
gttctactcc aaaggcccta agtccaatat tgacttcaaa attaaaaagg agaatacaat  3000
tgaccaaacg gcaaatgttg tatttcgcta catgtcgtct gaacccatta tcttcgggga  3060
atcaagcatc tttgtagagt acaagaagtt ctcgaatgac aagggttttc cgaaagagta  3120
cggtagtgga aagatcgtgc tttacaacgg ggtgaactac cttaataata tctattgttt  3180
ggagtatatt aacacgcaca atgaggtggg aatcaaatcg gtggtcgtac ctattaagtt  3240
catcgcggaa tttttggtga atgggggagat tttgaaacca cgtatcgata aaacgatgaa  3300
gtacattaac tctgaggact actacggtaa ccagcataac attatcgtag agcatttgcg  3360
cgaccaatcc atcaaaatcg gggacatttt taatgaagac aaactttctg acgtaggcca  3420
ccagtatgca aataatgata gtttcgtct   taatcccgag gtgtcttatt ttactaataa  3480
acgcacgcgc ggccgttag gaatttttaag caactacgtt aagaccttgc tgatctctat  3540
gtattgcagt aaaacgttct tagacgattc caataagcgc aaagtacttg ctattgactt  3600
cggtaatggg gctgacctgg agaagtattt ttacggtgag atcgctttgc ttgtggctac  3660
cgaccccggac gccgacgcca tcgcccgtgg caatgagcgc tataacaaat tgaattctgg  3720
tattaagact aaatactata agtttgatta tattcaagag acgatccgct ggatacgtt   3780
tgtttcgtcc gtacgcgaag tattctattt cgggaaattt aatatcattg actggcaatt  3840
tgcaattcat tacagcttcc accccgtca ctatgcgacg gtcatgaaca atttgtccga  3900
attaacggct tcaggcggca aggtgttgat tacaacaatg gatggagata aattatccaa  3960
attaaccgat aaaaagacat tcatcatcca caagaactta ccgagctcgg aaaattatat  4020
gtcagtagaa aaaattgcgg atgatcgtat cgtggtttac aatccgagca ccatgtccac  4080
gcctatgacg gaatacatca ttaagaaaaa cgacattgta cgcgtattca acgaatatgg  4140
tttcgttctt gtcgacaacg ttgactttgc taccatcatc gaacgttcta aaaagtttat  4200
taatggtgcc agtaccatgg aagaccgtcc atccaccgc aatttctttg agcttaatcg  4260
cggtgcaatc aaatgcgaag gacttgatgt ggaagatctt cttagttatt acgttgtcta  4320
cgtgttctcg aaacgttaac gaattcgagc tcggcgcgcc tgcaggtcga caagcttgcg  4380
gccgcataat gcttaagtcg aacagaaagt aatcgtattg tacaataatg tgcctgtcaa  4440
atggacgaag cagggattct gcaaacccta tgctactccg tcaagccgtc aattgtctga  4500
ttcgttacca attatgacaa cttgacggct acatcattca ctttttcttc acaaccggca  4560
cggaactcgc tcgggctggc cccggtgcat tttttaaata cccgcgagaa atagagttga  4620
tcgtcaaaac caacattgcg accgacggtg gcgataggca tccgggtggt gctcaaaagc  4680
agcttcgcct ggctgtatacg ttggtcctcg cgccagcttca agacgctaat ccctaactgg  4740
tggcggaaaa gatgtgacag acgcgacggc gacaagcaaa catgctgtgc gacgctggcg  4800
atatcaaaat tgctgtctgc caggtgatcg ctgatgtact gacaagcctc gcgtacccga  4860
ttatccatcg tgtgatggag cgactcgtta atcgcttcca tgcgccgcag taacaattgc  4920
tcaagcagat ttatcgccag cagctccgaa tagcgccctt cccccttgcc ggcgttaatg  4980
atttgcccaa acaggtcgct gaaatgcggc tggtgcgctt catccgggcg aaagaacccc  5040
gtattggcaa atattgacgg ccagttaagc cattcatgcc agtaggcgcg cggacgaaag  5100
taaacccact ggtgatacca ttcgcgagcc tccggatgac gaccgtagtg atgaatctct  5160
cctggcggga acagcaaaat atcacccgt  cggcaaacaa attctcgtcc ctgattttttc  5220
accaccccct gaccgcgaat ggtgagattg agaatataac ctttcattcc cagcggtcgg  5280
tcgataaaaa aatcgagata accgttggcc tcaatcggcg ttaacccgcc accagatggg  5340
gcattaaacg agtatcccgg cagcagggga tcatttgcg cttcagccat acttttcata  5400
ctcccgccat tcagagaaga accaattgt   ccatattgca tcagacattg ccgtcactgc  5460
gtcttttact ggctcttctc gctaaccaaa ccggtaaccc cgcttattaa agcattctg   5520
taacaaagcg ggaccaaagc catgacaaaa acgcgtaaca aaagtgtcta taatcacggc  5580
agaaaagtcc acattgatta tttgcacggc gtcacctttta tgccatagca ttttttatcc  5640
  taagattagc ggatcctacc tgacgcttttt tatcgc      aactctctac tgttctcca  5700
taccccgtttt tttgggctag ccatcttagt atattagtta agtataagaa ggagatatac  5760
aatggacgag attgttaaaa acattcgcga gggaacgcac gtcttgttac ccttctacga  5820
gactttaccg gagttgaact tgtctctggg aaagagtccc ttaccgagtt tagagtacgg  5880
cgcaaactac tttctgcaaa ttagtcgcgt taatgatctg aatcgtatgc ccacagatat  5940
```

```
gttgaagctg tttacccacg acattatgct gccggaatct gacttagata aggtatacga   6000
aatcctgaag atcaatagcg ttaaatatta tgggcgctcg actaaagcgg atgcggttgt   6060
ggcggatctg tccgcgcgca ataaattatt caagcgcgaa cgcgatgcaa tcaaaagtaa   6120
taaccatctc accgaaaata atctgtatat ttccgactat aaaatgttga cattcgacgt   6180
ttttcgcccc ttgttttgact ttgtgaacga gaaatactgc attatcaagc tgccgacttt   6240
attcggacgt ggcgtaattg acaccatgcg tatctattgt tcgttgttta agaacgtccg   6300
tttgcttaag tgtgtgtccg atagctggtt aaaggacagc gcgatcatgg tggcttctga   6360
tgtgtgtaag aaaaatcttg atctgttcat gagccacgtc aaatctgtca ctaaaagcag   6420
cagttggaag gacgttaaca gcgttcagtt ctcgatcttg aacaacccag tggacactga   6480
attcattaac aaatttcttg aattttcaaa ccgcgtatac gaggcattgt attatgtaca   6540
ctctcttctt tattcgtcaa tgacgagtga ttcaaagagt atcgaaaaca aacaccaacg   6600
tcgcctggtg aaattattac tgtaatggca gatctcaatt ggatatcggc cggccacgcg   6660
atcgctgacg tcggtaccct cgagtctggt aaagaaaccg ctgctgcgaa atttgaacgc   6720
cagcacatgg actcgtctac tagcgcagct taattaacct aggctgctgc caccgctgag   6780
caataactag cataacccct tggggcctct aaacgggtct tgaggggttt tttgctgaaa   6840
ggaggaacta tatccggatt ggcgaatggg acgcgccctg tagcggcgca ttaagcgcgg   6900
cgggtgtggt ggttacgcgc agcgtgaccg ctacacttgc cagcgcccta gcgcccgctc   6960
ctttcgcttt cttcccttcc tttctcgcca cgttcgccgg ctttccccgt caagctctaa   7020
atcgggggct ccctttaggg ttccgattta gtgctttacg gcacctcgac cccaaaaaac   7080
ttgattaggg tgatggttca cgtagtgggc catcgccctg atagacggtt tttcgccctt   7140
tgacgttgga gtccacgttc tttaatagtg gactcttgtt ccaaactgga acaacactca   7200
accctatctc ggtctattct tttgatttat aagggattt cg gccgatttcg gcctattggt   7260
taaaaatga gctgatttaa caaaaattta acgcgaattt taacaaaata ttaacgttta   7320
caatttctgg cggcacgatg gcatgagatt atcaaaaagg atcttcacct agatcctttt   7380
aaaattaaaa tgaagtttta aatcaatcta agtatatat gagtaaactt ggtctgacag   7440
ttaccaatgc ttaatcagtg aggcacctat ctcagcgatc tgtctatttc gttcatccat   7500
agttgcctga ctccccgtcg tgtagataac tacgatacgg gagggcttac catctggccc   7560
cagtgctgca atgataccgc gagacccacg ctcaccggct ccagatttat cagcaataaa   7620
ccagccagcc ggaagggccg agcgcagaag tggtcctgca actttatccg cctccatcca   7680
gtctattaat tgttgccggg aagctagagt aagtagttcg ccagttaata gtttgcgcaa   7740
cgttgttgcc attgctacag gcatcgtggt gtcacgctcg tcgtttggta tggcttcatt   7800
cagctccggt tcccaacgat caaggcgagt tacatgatcc cccatgttgt gcaaaaaagc   7860
ggttagctcc ttcggtcctc cgatcgttgt cagaagtaag ttggccgcag tgttatcact   7920
catggttatg gcagcactgc ataattctct tactgtcatg ccatccgtaa gatgcttttc   7980
tgtgactgtg gagtactcaa ccaagtcatt ctgagaataa tgtatgcggc gaccgagttg   8040
ctcttgcccg gcgtcaatac gggataatac cgcgccacat agcagaactt taaaagtgct   8100
catcattgga aaacgttctt cggggcgaaa actctcaagg atcttaccgc tgttgagatc   8160
cagttcgatg taacccactc gtgcacccaa ctgatcttca gcatctttta ctttcaccag   8220
cgtttctggg tgagcaaaaa caggaaggca aaatgccgca aaaaagggaa taagggcgac   8280
acggaaatgt tgaatactca tactcttcct ttttcaatca tgattgaagc atttatcagg   8340
gttattgtct catgagcgga tacatatttg aatgtattta gaaaaataaa caaataggtc   8400
atgaccaaaa tcccttaacg tgagttttcg ttccactgag cgtcagaccc cgtagaaaag   8460
atcaaaggat cttcttgaga tccttttttt ctgcgcgtaa tctgctgctt gcaaacaaaa   8520
aaaccaccgc taccagcggt ggtttgtttg ccggatcaag agctaccaac tcttttttccg   8580
aaggtaactg gcttcagcag agcgcagata ccaaatactg tccttctagt gtagccgtag   8640
ttaggccacc acttcaagaa ctctgtagca ccgcctacat acctcgctct gctaatcctg   8700
ttaccagtgg ctgctgccaa tggcgataag tcgtgtctta ccgggttgga ctcaagacga   8760
tagttaccgg ataaggcgca gcggtcgggc tgaacggggg gttcgtgcac acagcccagc   8820
ttggagcgaa cgacctacac cgaactgaga tacctacagc gtgagctatg agaaagcgcc   8880
acgcttcccg aagggagaaa ggcggacagg tatccggtaa gcggcagggt cggaacagga   8940
gagcgcacga gggagcttcc aggggaaac gcctggtatc tttatagtcc tgtcgggttt   9000
cgccacctct gacttgagcg tcgatttttt gtgatgctcg tcaggggggcg gagcctatgg   9060
aaaaacgcca gcaacgcggc ctttttacgg ttcctggcct tttgctggcc ttttgctcac   9120
atgttctttc ctgcgttatc ccctgattct gtggataacc gtattaccgc ctttgagtga   9180
gctgataccg ctcgccgcag ccgaacgacc gagcgcagcg agtcagtgag cgaggaagcg   9240
gaagagcgcc tgatgcggta ttttctcctt acgcatctgt gcggtatttc acaccgcata   9300
tatggtgcac tctcagtaca atctgctctg atgccgcata gttaagccag tatacactcc   9360
gctatcgcta cgtgactggg tcatggctgc gccccgacac ccgccaacac ccgctgacgc   9420
gccctgacgg gcttgtctgc tcccggcatc cgcttacaga caagctgtga ccgtctccgg   9480
gagctgcatg tgtcagaggt tttcaccgtc atcaccgaaa cgcgcgaggc agctgcggta   9540
aagctcatca gcgtggtcgt gaagcgattc acagatgtct gcctgttcat ccgcgtccag   9600
ctcgttgagt ttctccagaa gcgttaatgt ctggcttctg ataaagcggg ccatgttaag   9660
ggcggttttt tcctgtttgg tcactgatgc ctccgtgtaa gggggatttc tgttcatggg   9720
ggtaatgata ccgatgaaac gagagaggat gctcacgata cgggttactg atgatgaaca   9780
tgcccggtta ctggaacgtt gtgagggtaa acaactggcg gtatggatgc ggcgggacca   9840
gagaaaaatc actcagggtc aatgccagcg cttcgttaat acagatgtag gtgttccaca   9900
gggtagccag cagcatcctg cgatgcagat ccggaacata atggtgcagg cgctgacttc   9960
ccgcgtttcc agactttacg aaacacggaa accgaagacc attcatgttg ttgctcaggt  10020
cgcagacgtt ttgcagcagc agtcgcttca cgttcgctcg cgtatcgtgc attcattctg  10080
ctaaccagta aggcaacccc gccgcctag ccgggtcctc aacgacagga gcacgatcat  10140
gctagtcatg ccccgcgccc accggaagga gctgactggg ttgaaggctc tcaagggcat  10200
cggtcgagat cccggtgcct aatgagtgag ctaacttaca ttaattgcgt tgcgctcact  10260
gcccgctttc cagtcgggaa acctgtcgtg ccagctgcat taatgaatcg gccaacgcgc  10320
ggggagaggc ggtttgcgta ttgggcgcca gggtggtttt tcttttcacc agtgagacgg  10380
gcaacagctg attgcccttc accgcctggc cctgagagag ttgcagcaag cggtccacgc  10440
tggtttgccc cagcaggcga aaatcctgtt tgatggtggt taacggcggg atataacatg  10500
agctgtcttc ggtatcgtcg tatcccacta ccgagatgtc cgcaccaacg cgcagcccgg  10560
actcggtaat ggcgcgcatt gcgcccagcg ccatctgatc gttggcaacc agcatcgcag  10620
tgggaacgat gccctcattc agcatttgca tggtttgttg aaaaccggac atggcactcc  10680
```

```
agtcgccttc ccgttccgct atcggctgaa tttgattgcg agtgagatat ttatgccagc   10740
cagccagacg cagacgcgcc gagacagaac ttaatgggcc cgctaacagc gcgatttgct   10800
ggtgacccaa tgcgaccaga tgctccacgc ccagtcgcgt accgtcttca tgggagaaaa   10860
taatactgtt gatgggtgtc tggtcagaga catcaagaaa taacgccgga acattagtgc   10920
aggcagcttc cacagcaatg gcatcctggt catccagcga atagttaatg atcagcccac   10980
tgacgcgttg cgcgagaaga ttgtgcaccg ccgctttaca ggcttcgacg ccgcttcgtt   11040
ctaccatcga caccaccacg ctggcaccca gttgatcggc gcgagattta atcgccgcga   11100
caatttgcga cggcgcgtgc agggccgac tggaggtggc aacgcaatc agcaacgact     11160
gtttgcccgc cagttgttgt gccacgcggt tgggaatgta attcagctcc gccatcgccg   11220
cttccacttt ttcccgcgtt ttcgcagaaa cgtggctggc ctggttcacc acgcgggaaa   11280
cggtctgata agagacaccg gcatactctg cgacatcgta taacgttact ggtttcac    11338
```

```
SEQ ID NO: 21          moltype = DNA  length = 8096
FEATURE                Location/Qualifiers
source                 1..8096
                       mol_type = other DNA
                       organism = synthetic construct
SEQUENCE: 21
tggcgaatgg gacgcgccct gtagcggcgc attaagcgcg gcgggtgtgg tggttacgcg     60
cagcgtgacc gctacacttg ccagcgccct agcgcccgct cctttcgctt tcttcccttc    120
ctttctcgcc acgttcgccg gctttccccg tcaagctcta atcggggggc tccctttagg    180
gttccgattt agtgctttac ggcacctcga ccccaaaaaa cttgattagg gtgatggttc    240
acgtagtggg ccatcgccct gatagacggt ttttcgccct tgacgttgga gtccacgtt    300
ctttaatagt ggactcttgt tccaaactgg aacaacactc aacccatatct cggtctattc   360
ttttgattta agggatt tgccgatttc ggcctattgg ttaaaaaatg agctgattta       420
acaaaaattt aacgcgaatt ttaacaaaat attaacgttt acaatttcag gtggcacttt    480
tcggggaaat gtgcgcggaa cccctatttg tttatttttc taaatacatt caaatatgta    540
tccgctcatg agacaataac cctgataaat gcttcaataa tattgaaaaa ggaagagtat    600
gagtattcaa catttccgtg tcgcccttat tccctttttt gcggcatttt gccttcctgt    660
ttttgctcac ccagaaacgc tggtgaaagt aaaagatgct gaagatcagt tgggtgcacg    720
agtgggttac atcgaactgg atctcaacag cggtaagatc cttgagagtt ttcgccccga    780
agaacgtttt ccaatgatga gcacttttaa agttctgcta tgtggcgcgg tattatcccg    840
tattgacgcc gggcaagagc aactcggtcg ccgcatacac tattctcaga atgacttggt    900
tgagtactca ccagtcacag aaaagcatct tacggatggc atgacagtaa gagaattatg    960
cagtgctgcc ataaccatga gtgataacac tgcggccaac ttacttctga caacgatcga   1020
aggaccgaag gagctaaccg cttttttgca caacatgggg gatcatgtaa ctcgccttga   1080
tcgttgggaa ccggagctga atgaagccat accaaacgac gagcgtgaca ccacgatgcc   1140
tgcagcaatg gcaacaacgt tgcgcaaact attaactggc gaactactta ctctagcttc   1200
ccggcaacaa ttaatagact ggatggaggc ggataaagtt gcaggaccac ttctgcgctc   1260
ggcccttccg gctggctggt ttattgctga taaatctgga gccggtgagc gtgggtctcg   1320
cggtatcatt gcagcactgg ggccagatgg taagccctcc cgtatcgtag ttatctacac   1380
gacggggagt caggcaacta tggatgaacg aaatagacag atcgctgaga taggtgcctc   1440
actgattaag cattggtaac tgtcagacca agtttactca tatatacttt agattgattt   1500
aaaacttcat ttttaattta aaaggatcta ggtgaagatc ctttttgata atctcatgac   1560
caaaatccct taacgtgagt tttcgttcca ctgagcgtca ccccgtag aaaagatcaa     1620
aggatcttct tgagatcctt ttttttctgcg cgtaatctgc tgcttgcaaa caaaaaaacc   1680
accgctacca gcggtggttt gtttgccgga tcaagagcta ccaactcttt ttccgaaggt   1740
aactggcttc agcagagcgc agataccaaa tactgtcctt ctagtgtagc cgtagttagg   1800
ccaccacttc aagaactctg tagcaccgcc tacatacctc gctctgctaa tcctgttacc   1860
agtggctgct gccagtggcg ataagtcgtg tcttaccggg ttggactcaa gacgatagtt   1920
accggataag gcgcagcggt cgggctgaac ggggggttcg tgcacacagc ccagcttgga   1980
gcgaacgacc tacaccgaac tgagatacct acagcgtgag ctatgagaaa gcgccacgct   2040
tcccgaaggg agaaaggcgg acaggtatcc ggtaagcggc agggtcggaa caggagagcg   2100
cacgagggag cttccagggg gaaacgcctg gtatctttat agtcctgtcg ggtttcgcca   2160
cctctgactt gagcgtcgat ttttgtgatg ctcgtcagg gggcggagcc tatggaaaaa    2220
cgccagcaac gcggcctttt tacggttcct ggccttttgc tggccttttg ctcacatgtt   2280
ctttcctgcg ttatccctg attctgtgga taaccgtatt accgcctttg agtgagctga   2340
taccgctcgc cgcagccgaa cgaccgagcg cagcgagtca gtgagcgagg aagcggaaga   2400
gcgcctgatg cggtattttc tccttacgca tctgtgcggt atttcacacc gcatatatgg   2460
tgcactctca gtacaatctg ctctgatgcc gcatagttaa gccagtatac actccgctat   2520
cgctacgtga ctgggtcatg gctgcgcccc gacacccgcc aacacccgct gacgcgccct   2580
gacgggcttg tctgctcccg gcatccgctt acagacaagc tgtgaccgtc tccgggagct   2640
gcatgtgtca gaggttttca ccgtcatcac cgaaacgcgc gaggcagctg cggtaaagct   2700
catcagcgtg gtcgtgaagc gattcacaga tgtctgcctg ttcatccgcg tccagctcgt   2760
tgagtttctc cagaagcgtt aatgtctggc ttctgataaa gcgggccatg ttaagggcgg   2820
ttttttcctg tttggtcact gatgcctccg tgtaagggg atttctgttc atgggggtaa    2880
tgataccgat gaaacgagag aggatgctca cgatacgggt tactgatgat gaacatgccc    2940
ggttactgga acgttgtgag ggtaaacaac tggcggtatg gatgcggcgg gaccagagaa    3000
aaatcactca gggtcaatgc cagcgcttcg ttaatacaga tgtaggtgtt ccacaggta    3060
gccagcagca tcctgcgatg cagatccgga acataatggt gcagggcgct gacttccgcg    3120
tttcagact ttacgaaaca cggaaaccga agaccattca tgttgttgct caggtcgcag     3180
acgtttgca gcagcagtcg cttcacgttc gctcgcgtat cggtgattca ttctgctaac    3240
cagtaaggca accccgccag cctagccggg tcctcaacga caggagcacg atcatgcgca   3300
cccgtgggga cgccatgccg gcgataatgg cctgcttgtt ggtgggcgg                  3360
gaccagtgac gaaggcttga gcgagggcgt gcaagattcc gaataccgca agcgacaggc     3420
cgatcatcgt cgcgctccag cgaaagcggt cctcgccgaa aatgacccag agcgctgccg    3480
gcacctgtcc tacgagttgc atgataaaga agacagtcat aagtgcggcg acgatagtca    3540
tgccccgcgc ccaccggaag gagctgactg ggttgaaggc tctcaaggc atcggtcgag     3600
atcccggtgc ctaatgagtg agctaactta cattaattgc gttgcgctca ctgcccgctt    3660
```

```
tccagtcggg aaacctgtcg tgccagctgc attaatgaat cggcaaacgc gcggggagag 3720
gcggtttgcg tattgggcgc cagggtggtt tttcttttca ccagtgagac gggcaacagc 3780
tgattgccct tcaccgcctg gccctgagag agttgcagca agcggtccac gctggtttgc 3840
cccagcaggc gaaaatcctg tttgatggtg gttaacggcg ggatataaca tgagctgtct 3900
tcggtatcgt cgtatcccac taccgagata tccgcaccaa cgcgcagccg ggactcggta 3960
atggcgcgca ttgcgcccag cgccatctga tcgttggcaa ccagcatcgc agtgggaacg 4020
atgccctcat tcagcatttg catggtttgt tgaaaaccgg acatggcact ccagtcgcct 4080
tcccgttccg ctatcggctg aatttgattg cgagtgagat atttatgcca gccagcagaa 4140
cgcagacgcg ccgagacaga acttaatggg cccgctaaca gcgcgatttg ctggtgaccc 4200
aatgcgacca gatgctccac gcccagtcgc gtaccgtctt catgggagaa aataatactg 4260
ttgatgggtg tctggtcaga gacatcaaga aataacgccg gaacattagt gcaggcagct 4320
tccacagcaa tggcatcctg gtcatccagc ggatagttaa tgatcagccc actgacgcgt 4380
tgcgcgagaa gattgtgcac cgccgcttta caggcttcga cgccgcttcg ttctaccatc 4440
gacaccacca cgctggcacc cagttgatcg gcgcgagatt taatcgccgc gacaatttgc 4500
gacggcgcgt gcagggccag actgaggtg gcaacgccaa tcagcaacga ctgtttgccc 4560
gccagttgtt gtgccacgcg gttgggaatg taattcagct ccgccatcgc cgcttccact 4620
ttttcccgcg ttttcgcaga aacgtggctg gcctggttca ccacgcggga aacggtctga 4680
taagagacac cggcatactc tgcgacatcg tataacgtta ctggtttcac attcaccacc 4740
ctgaattgac tctcttccgg gcgctatcat gccataccgc gaaaggtttt gcgccattcg 4800
atggtgtccg ggatctcgac gctctccctt atgcgactcc tgcattagga agcagcccag 4860
tagtaggttg aggccgttga gcaccgccgc cgcaaggaat ggtgcatgca aggagatggc 4920
gcccaacagt cccccggcca cggggcctgc caccataccg accgaaac aagcgctcat 4980
gagcccgaag tggcgagccc gatcttcccc atcggtgatg tcggcgatat aggcgccagc 5040
aaccgcacct gtggccgg tgatgccggc cacgatgcgt ccgcgtaga ggatcgagat 5100
ctataatgtg cctgtcaaat ggacgaagca gggattctgc aaaccctatg ctactccgtc 5160
aagccgtcaa ttgtctgatt cgttaccaat tatgacaact tgacggctac atcattcact 5220
ttttcttcac aaccggcacg gaactcgctc gggctggccc cggtgcattt tttaaatacc 5280
cgcgagaaat agagttgatc gtcaaaacca acattgcgac cgacggtggc gataggcatc 5340
cgggtggtgc tcaaaagcag cttcgcctgg ctgatacgtt ggtcctcgcg ccagcttaag 5400
acgctaatcc ctaactgctg gcggaaaaga tgtgacagca gcgacggcga caagcaaaca 5460
tgctgtgcga cgctggcgat atcaaaattg ctgtctgcca ggtgatcgct gatgtactga 5520
caagcctcgc gtacccgatt atccatcggt ggatggagcg actcgttaat cgcttccatg 5580
cgccgcagta acaattgctc aagcagattt atcgccagca gctccgaata gcgcccttcc 5640
ccttgcccgg cgttaatgat ttgcccaaac aggtcgctga aatgcggctg gtgcgcttca 5700
tccgggcgaa agaacccgt attggcaaat attgacggcc agttaagcca ttcatgccag 5760
taggcgcgcg gacgaaagta aacccactgg tgataccatt cgcgagcctc cggatgacga 5820
ccgtagtgat gaatctctcc tggcgggaac agcaaaatat cacccggtcg gcaaacaaat 5880
tctcgtccct gatttttcac caccccctga ccgcgaatgg tgagattgag aatataacct 5940
ttcattccca gcggtcggtc gataaaaaaa tcgagataac cgttggcctc aatcggcgtt 6000
aaacccgcca ccagatgggc attaaacgag tatcccggca gcaggggatc attttgcgct 6060
tcagccatac ttttcatact cccgccattc agagaagaaa ccaattgtcc atattgcatc 6120
agacattgcc gtcactgcgt cttttactgg ctcttctcgc taaccaaacc ggtaaccccg 6180
cttattaaaa gcattctgta acaaagcggg accaaagcca tgacaaaaac gcgtaacaaa 6240
agtgtctata atcacggcag aaaagtccac attgattatt tgcacggcgt cacactttgc 6300
tatgccatag catttttatc cataagatta gcggatccta cctgacgctt tttatcgcaa 6360
ctctctactg tttctccata cccgtttttt tgggctagtc tagaaataat tttgttaac 6420
tttaagaagg agatatacat tgacactacc gaggtgtact attttaccc gagtcgctaa 6480
ttttgccgc aaggtgctaa gccgcgagga aagcgaggct gaacaggcag tcgcccgtcc 6540
acaggtgacg gtgatcccgc gtgagcagca tgctatttcc cgcaaagata tcagtgaaaa 6600
tgccctgaag gtaatgtaca ggctcaataa agcgggatac gaagcctggc tggttggcgg 6660
cggcgtcgcg gacctgttac ttggcaaaaa gccgaaagat tttgacgtaa ccactaacgc 6720
cacgcctgag caggtgcgca aactgttccg taactgccgc ctggtgggtc gccgtttccg 6780
tctggctcat gtaatgtttg gcccggagat tatcgaagtt gcgaccttcc gtggacacca 6840
cgaaggtaac gtcagcgacc gcacgacctc caacgcgggg caaaacggca tgttgctgcg 6900
cgacaacatt ttcggctcca tcgaagaaga cgcccagcgc cgcgatttca ctatcaacag 6960
cctgtattac agcgtagcgg attttaccgt ccgtgattac gttggcggca tgaaggatct 7020
gaaggacggc gttatccgtc tgattggtaa cccggaaacg cgctaccgtg aagatccggt 7080
acgtatgctg cgcgcggtac gttttgccgc caaattgggg atgcgcatca gcccggaaac 7140
cgcagaaccg atccctcgcc tcgctaccct gctgaacgat atcccaccgg cacgcctgtt 7200
tgaagaatcg cttaaactgc tacaagcggg ctacggttac gaaacctata agctgttgtg 7260
tgaatatcat ctgttccagc cgctgttccc gaccattacc cgctacttca cggaaaatgg 7320
cgacagcccg atggagcgga tcattgaaca ggtgctgaag aataccgata cgcgtatcca 7380
taacgatatg cgcgtgaacc cggcgttcct gttttgccgcc atgttctggt acccactgct 7440
ggagacgcaa cagaagatcg cccaggaaag cggcctgacc tatcacgacg ctttcgcgtt 7500
ggcgatgaac gacgtgctgg acgaagcctg ccgttcactg gcaatcccga aacgtctgac 7560
gacattaacc cgcgatatct ggcagttgca gttgcgtatg tcccgtcgtc agggtaaacg 7620
cgcatgaaa ctgctggagc atcctaagtt ccgtgcggct tatgacctgt ggccttgcg 7680
agctgaagtt gagcgtaacg ctgaactgca gcgtctggtg aaatggtggg gtgagttcca 7740
ggtttccgcg ccaccagacc aaaaaggat gctcaacgag accgtccga 7800
gcgtcgtcgt actcgtcgtc cacgcaaacg cgcaccacgt cgtgagggta ccgcacacca 7860
tcaccatcac cactgagata tcggaattaa ttcggatccg aattcgagct ccgtcgacaa 7920
gcttgcggcc gcactcgagc accaccacca ccaccactga gatccggctg ctaacaaagc 7980
ccgaaaggaa gctgagttgg ctgctgccac cgctgagcaa taactagcat aaccccttgg 8040
ggcctctaaa cgggtcttga ggggttttt gctgaaagga ggaactatat ccggat 8096
```

SEQ ID NO: 22        moltype = DNA  length = 2679
FEATURE               Location/Qualifiers
source                1..2679
                       mol_type = other DNA

```
                        organism = synthetic construct
SEQUENCE: 22
atgcatcacc atcaccatca cgctagcatg aacacgatta acatcgctaa gaacgacttc    60
tctgacatcg aactggctgc tatcccgttc aacactctgg ctgaccatta cggtgagcgt   120
ttagctcgcg aacagttggc ccttgagcat gagtcttacg agatgggtga agcacgcttc   180
cgcaagatgt ttgagcgtca acttaaagct ggtgaggttg cggataacgc tgccgccaag   240
cctctcatca ctaccctact ccctaagatg attgcacgca tcaacgactg gtttgaggaa   300
gtgaaagcta agcgcggcaa gcgcccgaca gccttccagt tcctgcaaga aatcaagccg   360
gaagccgtag cgtacatcac cattaagacc actctggctt gcctaaccag tgctgacaat   420
acaaccgttc aggctgtagc aagcgcaatc ggtcggccca ttgaggacga ggctcgcttc   480
ggtcgtatcc gtgaccttga agctaagcac ttcaagaaaa acgttgagga caaactcaac   540
aagcgcgtag ggcacgtcta caagaaagca tttatgcaag ttgtcgaggc tgacatgctc   600
tctaagggtc tactcggtgg cgaggcgtgg tcttcgtggc ataaggaaga ctctattcat   660
gtaggagtac gctgcatcga gatgctcatt gagtcaaccg gaatggttag cttacaccgc   720
caaaatgctg cgctagtagg tcaagactct gagactatcg aactcgcacc tgaatacgct   780
gaggctatcg caacccgtgc aggtgcgctg gctggcatct ctccgatgtt ccaaccttgc   840
gtagttcctc ctaagccgtg gactggcatt actggtggtg gctattgggc taacggtcgt   900
cgtcctctgg cgctggtgcg tactcacagt aagaaagcac tgatgcgcta cgaagacgtt   960
tacatgcctg aggtgtacaa agcgattaac attgcgcaaa acaccgcatg gaaaatcaac  1020
aagaaagtcc tagcggtcgc caacgtaatc accaagtgga agcattgtcc ggtcgaggac  1080
atccctgcga ttgagcgtga agaactcccg atgaaaccgg aagacatcga catgaatcct  1140
gaggctctca ccgcgtggaa acgtgctgcc gctgctgtgt accgcaagga caaggctcgc  1200
aagtctcgcc gtatcagcct tgagttcatg cttgagcaag ccataagttg tgctaaccat  1260
aaggccatct ggttccctta caacatggac tggcgcggtc gtgtttacgc tgtgtcaatg  1320
ttcaacccgc aaggtaacga tatgaccaaa ggactgctta cgctggcgaa aggtaaacca  1380
atcggtaagg aagttactag ctggctgaaa atccacggtg caaactgtgc gggtgtcgat  1440
aaggttccgt tccctgagcg catcaagttc attgaggaaa accacgagaa catcatggct  1500
tgcgctaagt ctccactgga gaacacttgg tgggctgagc aagattctcc gttctgcttc  1560
cttgcgttct gctttgagta cgctggggta cagcaccacg gctgagcta taactgctcc  1620
cttccgctga cgtttgacgg tcttgctct ggcatccgac acttctccgc gatgctccga  1680
gatgaggtag gtgtcgcgc ggttaacttg cttcctagtg aaaccgttca ggacatctac  1740
gggattgttg ctaagaaagt caacgagatt ctacaagcag acgcaatcaa tgggaccgat  1800
aacgaagtag ttaccgtgac cgatgagaac actggtgaaa tctctgagaa agtcaagctg  1860
ggcactaagg cactggctgg tcaatggctg gcttacggtg ttactcgcag tgtgactaag  1920
cgttcagtca tgacgctggc ttacgggtcc aaagagttcg gcttccgtca acaagtgctg  1980
gaagatacca ttcagccagc tattgattcc ggcaagggtc tgatgttcac tcagccgaat  2040
caggctgctg gatacatggc taagctgatt tgggaatctg tgagcgtgac ggtggtagct  2100
gcggttgaag caatgaactg gcttaagtct gctgctaagc tgctggctgc tgaggtcaaa  2160
gataagaaga ctggagagat tcttcgcaag cgttgccgtg tgcattgggt aactcctgat  2220
ggtttccctg tgtggcagga atacaagaag cctattcaga cgcgcttgaa cctgatgttc  2280
ctcggtcagt tccgcttaca gcctaccatt aacaccaaca aagatagcga gattgatgca  2340
cacaaacagg agtctggtat cgctcctaac tttgtacaca gccaagacgg tagccacctt  2400
cgtaagactg tagtgtgggc acacgagaag tacggaatcg aatcttttgc actgattcac  2460
gactccttcg gtaccattcc ggctgacgct gcgaacctgt tcaaagcagt gcgcgaaact  2520
atggttgaca catatgagtc ttgtgatgta ctggctgatt tctacgacca gttcgctgac  2580
cagttgcacg agtctcaatt ggacaaaatg ccagcacttc cggctaaagg taacttgaac  2640
ctccgtgaca tcttagagtc ggacttcgcg ttcgcgtaa                         2679

SEQ ID NO: 23        moltype = DNA  length = 2613
FEATURE              Location/Qualifiers
source               1..2613
                     mol_type = other DNA
                     organism = synthetic construct
SEQUENCE: 23
atgaaacacc atcaccatca ccaccccatg tcagactacg atatcccaac cactgaaaac    60
ttatacttcc aaggggcaat ggacgcaaac gtcgtaagca gttctaccat tgcgacctac   120
attgacgcac tggcaaaaaa tgcatcggaa ttagagcagc gctctaccgc ctatgaaatt   180
aacaatgagt tagaattagt ttttattaag cctccgttaa ttccttaac caatgtagtc   240
aatattagta ctattcaaga gtctttcatc cgtttcacta ctaacaaga ggaaggggtg   300
aagatccgca cgaagattcc attgtcgaaa gtacacggac ttgatgtaaa gaacgttcaa   360
ttggtagatg caattgacaa tattgtatgg gaaaaaaagt ctcttgtgac cgaaaaccgt   420
ttacataaag agtgtctgct cgcgtttatct acggaggagc gccacatctt tttgattac   480
aagaaatacg gatcttctat ccgtctgaaa ttggtcaact taattcaggc caagactaaa   540
aatttcacaa ttgatttcaa attaaaatac tttttgggtt caggtgcgca gtcaagtcg   600
agcttattgc atgctatcaa ccatccgaaa agtcgcccca cacctctct ggagattgag   660
tttacgccac gcgataacga gacagtgccg tatgacgaat taattaaaga attgaccacg   720
ttaagccgcc atattttcat ggcgtcgcca gagaatgtta tccttagtcc cccaattaat   780
gcgccaatta agaccttcat gttacccaag caagacatcg tgggtctgga cttagagaac   840
ttgtacgcag tcaccaaaac ggatggtatt ccaatcacta ttcgcgtaac cagtaacgga   900
ctttattgct acttcacgca tctgggttac atcattcgtt acccggttaa acgtatcatc   960
gattctgagg tcgtggtatt cggcgaggca gtgaaagata aaactggac tgtataccctt  1020
attaaactta tcgagccggt aaatgcgatt aatgatcgtt tagaagaaag caagtatgtg  1080
gaatctaagc ttgtcgatat ctgtgatcgt atcgtgttca agtcgaaaaa gtatgagggg  1140
ccccttcacca ctactagta ggtagtagat atgcttagta cgtatttgcc aaaacaacca  1200
gaaggtgtca ttctgttcta ctccaaaggc cctaagtcca atattgactt caaaattaaa  1260
aaggagaata caattgacca aacggcaat ttgtatttc gctacatgtc gtctgaaccc  1320
attatcttcg gggaatcaag catctttgta gagtacaaga agttctcgaa tgacaagggt  1380
tttccgaaag agtacggtag tggaaagatc gtgctttaca acgggggtgaa ctaccttaat  1440
aatatctatt gtttggagta tattaacacg cacaatgagg tgggaatcaa atcggtggtc  1500
```

```
gtacctatta agttcatcgc ggaattttg gtgaatgggg agattttgaa accacgtatc   1560
gataaaacga tgaagtacat taactctgag gactactacg gtaaccagca taacattatc   1620
gtagagcatt tgcgcgacca atccatcaaa atcggggaca tttttaatga agacaaactt   1680
tctgacgtag gccaccagta tgcaaataat gataagtttc gtcttaatcc cgaggtgtct   1740
tatttacta ataaacgcac gcgcggcccg ttaggaattt taagcaacta cgttaagacc    1800
ttgctgatct ctatgtattg cagtaaaacg ttccttagacg attccaataa gcgcaaagta   1860
cttgctattg acttcggtaa tggggctgac ctggagaagt attttacgg tgagatcgct    1920
ttgcttgtgg ctaccgaccc ggacgccgac gccatcgccc gtggcaatga gcgctataac   1980
aaattgaatt ctggtattaa gactaaatac tataagtttg attatattca agagacgatc   2040
cgctcggata cgtttgtttc gtccgtacgc gaagtattct atttcgggaa atttaatatc   2100
attgactggc aatttgcaat tcattacagc ttccacccc gtcactatgc gacggtcatg    2160
aacaatttgt ccgaattaac ggcttcaggc ggcaaggtgt tgattacaac aatggatgga   2220
gataaattat ccaaattaac cgataaaaag acattcatca tccacaagaa cttaccgagc   2280
tcggaaaatt atatgtcagt agaaaaaatt gcggatgatc gtatcgtggt ttacaatcgt   2340
agcaccatgt ccacgcctat gacggaatac atcattaaga aaaacgacat tgtacgcgta   2400
ttcaacgaat atggtttcgt tcttgtcgac aacgttgact ttgctaccat catcgaacgt   2460
tctaaaaagt ttattaatgg tgccagtacc atggaagacc gtccatccac ccgcaatttc   2520
tttgagctta atcgcggtgc aatcaaatgc gaaggacttg atgtgaaga tcttcttagt    2580
tattacgttg tctacgtgtt ctcgaaacgt taa                                2613

SEQ ID NO: 24          moltype = DNA  length = 864
FEATURE                Location/Qualifiers
source                 1..864
                       mol_type = other DNA
                       organism = synthetic construct
SEQUENCE: 24
atggacgaga ttgttaaaaa cattcgcgag ggaacgcacg tcttgttacc cttctacgag    60
actttaccgg agttgaactt gtctctggga aagagtccct taccgagttt agagtacggc   120
gcaaactact ttctgcaaat tagtcgcgtt aatgatctga atcgtatgcc cacagatatg   180
ttgaagctgt ttacccacga cattatgctg ccggaatctg acttagataa ggtatacgaa   240
atcctgaaga tcaatagcgt taaatattat gggcgctcga ctaaagcgga tgcggttgtg   300
gcggatctgt ccgcgcgcaa taaattattc aagcgcgaac gcgatgcaat caaaagtaat   360
aaccatctta ccgaaaataa tctgtatatt tccgactata aatgttgac attcgacgtt    420
tttcgcccct tgtttgactt tgtgaacgag aaatactgca ttatcaagct gccgacttta   480
ttcggacgtg gcgtaattga caccatgcgt atctattgtt cgttgtttaa gaacgtccgt   540
ttgcttaagt gtgtgtccga tagctggtta aaggacagcg cgatcatggt ggcttctgat   600
gtgtgtaaga aaaatcttga tctgttcatg agccacgtca aatctgtcac taaaagcagc   660
agttggaagg acgttaacag cgttcagttc tcgatcttga caacccagt ggacactgaa    720
ttcattaaca aatttcttga atttcaaac cgcgtatacg aggcattgta ttatgtacac    780
tctcttcttt attcgtcaat gacgagtgat tcaaagagta tcgaaaacaa acaccaacgt   840
cgcctggtga aattattact gtaa                                          864

SEQ ID NO: 25          moltype = DNA  length = 1437
FEATURE                Location/Qualifiers
source                 1..1437
                       mol_type = other DNA
                       organism = synthetic construct
SEQUENCE: 25
ttgacactac cgaggtgtac tattttacc cgagtcgcta atttttgccg caaggtgcta    60
agccgcgagg aaagcgaggc tgaacaggca gtcgcccgtc cacaggtgac ggtgatcccg   120
cgtgagcagc atgctatttc ccgcaaagat atcagtgaaa atgccctgaa gtaatgtac    180
aggctcaata aagcgggata cgaagcctgg ctggttggcg gcggcgtgcg cgacctgtta   240
cttggcaaaa agccgaaaga ttttgacgta accactaacg ccacgcctga gcaggtgcgc   300
aaactgttcc gtaactgccg cctggtgggt cgccgtttcc gtctggctca tgtaatgttt   360
ggcccggaaa ttatcgaagt tgcgaccttc cgtggacacc acgaaggtaa cgtcagcgac   420
cgcacgacct cccaacgcgg gcaaaacggc atgttgctgc gcgacaacat tttcggctcc   480
atcgaagaag acgcccagcg ccgcgatttc actatcaaca gctgtattta cagcgtagcg    540
gatttttaccg tccgtgatta cgttggcggc atgaaggatc tgaaggacgg cgttatccgt   600
ctgattggta acccggaaac gcgctaccgt gaagatccgg tacgtatgct gcgcgcggta   660
cgttttgccg ccaaattggg tatgcgcatc agcccggaaa ccgcagaacc gatccctcgc   720
ctcgctaccc tgctgaacga tacccaccg gcacgcctgt ttgaagaatc gcttaaactg    780
ctacaagcgg gctacggtta cgaaacctat aagctgttgt gtgaatatca tctgttccag   840
ccgctgttcc cgaccattac ccgctacttc acggaaaatg gcgacagccc gatggagcgg   900
atcattgaac aggtgctgaa gaataccgat acgcgtatcc ttaacgatat cgcgtatgac   960
ccggcgttcc tgtttgccgc catgttctgt tacccactgc tggagacggc acagaagatc   1020
gcccaggaaa gcggcctgac ctatcacgac gctttcgcgc tggcgatgaa cgacgtgctg   1080
gacgaagcct gccgttcact ggcaatcccg aaacgtctga cgacattaac ccgcgatatc   1140
tggcagttgc agttgcgtat gtcccgtcgt cagggtaaac gcgcatggaa actgctgag    1200
catcctaagt tccgtgcgc ttatgacctg ttggccttgc gagctgaagt tgagcgtaac    1260
gctgaactgc agcgtctggt gaaatgtggg ggtgagtcc aggtttccgc gccaccagac    1320
caaaagggga tgctcaacga gctggatgaa gaaccgtcac cgcgtcgtcg tactcgtcgt   1380
ccacgcaaac gcgcaccacg tcgtgagggt accgcacacc atcaccatca ccactga      1437

SEQ ID NO: 26          moltype = DNA  length = 1389
FEATURE                Location/Qualifiers
source                 1..1389
                       mol_type = other DNA
                       organism = synthetic construct
SEQUENCE: 26
```

-continued

```
atgcaccatc accatcacca caaggtgcta agccgcgagg aaagcgaggc tgaacaggca    60
gtcgcccgtc cacaggtgac ggtgatcccg cgtgagcagc atgctatttc ccgcaaagat   120
atcagtgaaa atgccctgaa ggtaatgtac aggctcaata aagcgggata cgaagcctgg   180
ctggttggcg gcggcgtgcg cgacctgtta cttggcaaaa agccgaaaga ttttgacgta   240
accactaacg ccacgcctga gcaggtgcgc aaactgttcc gtaactgccg cctggtgggt   300
cgccgtttcc gtctggctca tgtaatgttt ggcccggaga ttatcgaagt tgcgaccttc   360
cgtggacacc acgaaggtaa cgtcagcgac cgcacgacct cccaacgcgg gcaaaacggc   420
atgttgctgc gcgacaacat tttcggctcc atcgaagaag acgcccagcg ccgcgatttc   480
actatcaaca gcctgtatta cagcgtagcg gattttaccg tccgtgatta cgttggcggc   540
atgaaggatc tgaaggacgg cgttatccgt ctgattggta acccggaaac gcgctaccgt   600
gaagatccgg tacgtatgct gcgcgcggta cgttttgccg ccaaattggg tatgcgcatc   660
agcccggaaa ccgcagaacc gatccctcgc ctcgctaccc tgctgaacga tatcccaccg   720
gcacgcctgt ttgaagaatc gcttaaactg ctacaagcgg gctacggtta cgaaacctat   780
aagctgttgt gtgaatatca tctgttccag ccgctgttcc cgaccattac ccgctacttc   840
acggaaaatg gcgacagccc gatggagcgg atcattgaac aggtgctgaa gaataccgat   900
acgcgtatcc ataacgatat gcgcgtgaac ccggcgttcc tgtttgccgc catgttctgg   960
tacccactgc tggagacggc acagaagatc gcccaggaaa gcggcctgac ctatcacgac  1020
gctttcgcgc tggcgatgaa cgacgtgctg gacgaagcct gccgttcact ggcaatcccg  1080
aaacgtctga cgacattaac ccgcgatatc tggcagttgc agttgcgtat gtcccgtcgt  1140
cagggtaaac gcgcatggaa actgctggag catcctaagt tccgtgcggc ttatgacctg  1200
ttggccttgc gagctgaagt tgagcgtaac gctgaactgc agcgtctggt gaaatggtgg  1260
ggtgagttcc aggtttccgc gccaccagac caaaaaggga tgctcaacga gctggatgaa  1320
gaaccgtcac cgcgtcgtcg tactcgtcgt ccacgcaaac gcgcaccacg tcgtgagggt  1380
accgcatga                                                           1389
```

ENZYME BASED SYSTEM FOR PRODUCTION OF MESSENGER RNA WITH INCREASED TRANSFECTION EFFICIENCY

CROSS-REFERENCE TO RELATED APPLICATIONS

This application claims the benefit of priority under 35 U.S.C. § 119(e) to U.S. Provisional Patent Application No. 63/244,990, filed Sep. 16, 2021. The entire disclosure of U.S. Provisional Patent Application No. 63/244,990 is incorporated herein by reference.

REFERENCE TO A SEQUENCE LISTING

This application contains a Sequence Listing submitted electronically as an ST.26 XML file format. The file, named "PAT005268_Sequence_Listing.xml", has a size of 64000 bytes, and was created on 12 Sep. 2022. The information contained in the ST.26 XML file is incorporated herein by reference in its entirety pursuant to 37 CFR § 1.52(e)(5).

FIELD

The present disclosure concerns production of synthetic messenger RNA (mRNA) via in vitro transcription (IVT) using a novel and cost effective method of enzyme production.

BACKGROUND

Recent success in messenger RNA-based vaccines in combatting the COVID-19 pandemic has validated the efficacy of RNA therapeutics and highlighted the need for efficient methods of mRNA production. Optimization of the conditions of mRNA production would target better yields of the core proteins involved in mRNA synthesis, increased mRNA purity, and improved assay methods for assessing mRNA quantity and quality. Optimized proteins for mRNA synthesis would be helpful due to both increased efficiency of mRNA production as well as cost of the proteins themselves, which are commercially available. Key components of any strategy would involve optimized plasmid constructs for recombinant expression of the core proteins used in IVT, optimized protein production conditions, and optimized protein purification protocols. Hornblower & al. (2015) "Minding your caps and tails—considerations for functional mRNA synthesis" New England Biolabs White Paper describes an exemplary in vitro synthesis scheme for mRNA. There is still a need for optimized methods of production of clinical manufacturing grade enzymes for use in therapeutic mRNA synthesis.

SUMMARY

Disclosed herein are apparatuses, systems and methods in the in vitro transcription of mRNA, wherein the process is optimized for the production of efficacious and inexpensive lots of clinically relevant agent for the treatment of human disease. The methods described herein relate to improvements in the production of the core proteins involved in in vitro transcription (IVT). The improvements include optimization in the expression vector sequences used for the bacterial production of proteins. The methods further include optimized conditions of production, the conditions including time and temperature. Finally, the methods include a means of evaluation of mRNA quality, where mRNA transfection and expression of encoded protein are assessed for quality of the protein components used in the IVT process.

In an embodiment, optimized bacterial expression vectors contain nucleotide sequences encoding the three IVT proteins are individually cloned into the expression vectors. In an aspect, a first DNA sequence, or insert, is cloned into a first bacterial expression vector, the first insert comprising the gene sequence for T7 RNA polymerase. The insert further comprises an arabinose promoter sequence upstream of the polymerase sequence. In an aspect, the insert is comprised of SEQ ID NO: 19. In an aspect, the codon optimized gene sequence for T7 RNA Polymerase is SEQ ID NO: 22.

In another aspect, a second gene sequence is cloned into a second bacterial expression vector, the insert comprising the gene sequences for the D1 and D12 subunits of the Vaccinia Virus Capping Enzyme (VVCE). The insert further comprises arabinose promoter sequences upstream on the D1 and D12 subunits. The insert further comprises ribosome binding sites (RBS) immediately downstream of the arabinose promoters. In an aspect, the insert is comprised of SEQ ID NO: 20. In an aspect, the codon optimized gene sequence for the D1 subunit of VVCE is SEQ ID NO: 23. In an aspect, the codon optimized gene sequence for the D12 subunit of VVCE is SEQ ID NO: 24.

In another aspect, a third insert is cloned into a third bacterial expression vector, the insert comprising the gene sequences for the Poly(A) polymerase. The insert further comprises an arabinose promoter sequence upstream of the Poly(A) polymerase sequence. In an aspect, the insert is comprised of SEQ ID NO: 21. In an aspect, the gene sequence for the Poly(A) polymerase is SEQ ID NO: 25.

In another aspect, bacteria contain expression vectors for protein expression and subsequent purification. In some cases, the conditions for protein growth and purification were enabled by modifications to the inserts which were cloned into the expression plasmids. Such modifications include placing an arabinose promoter upstream of the protein-encoding nucleotide sequence. Another modification involves placing two arabinose promoters upstream of VVCE, with one promoter upstream of the D1 subunit and the second promoter upstream of the D12 subunit. Further modifications include addition of nucleic acid sequences encoding His tags, wherein polymeric histidine is encoded in-frame with the protein sequence and placed at either the N or C terminus, and whereby proteins can be column purified after fermentation. Further modifications include addition of a Tobacco Etch Virus protease sequence, whereby the His tag sequence can be proteolytically removed subsequent to protein purification.

In an aspect, the purified proteins are sequentially added to an in vitro transcription reaction. First, the purified T7 RNA Polymerase is added to a reaction comprising linearized plasmid DNA encoding an mRNA transcript of interest. RNA is thereby transcribed from the linearized DNA via the action of the T7 RNA Polymerase. A second reaction comprises the RNA transcript from the first reaction, S-adenosyl Methionine, and purified VVCE. The RNA transcript is thereby capped at the N-terminal to generate cap 0 mRNA. A third reaction comprises capped mRNA from the VVCE reaction, purified poly(A) polymerase, and ATP, whereby a poly-adenylated tail is added to the 3' end of the capped mRNA transcript.

Various objects, features, aspects and advantages will become more apparent from the following detailed descrip-

BRIEF DESCRIPTION OF THE DRAWINGS

FIGS. 3A, 3B and 3C: Replacement of T7 promoter with arabinose promoter enables growth and protein expression in BL21 DE3 Clear Coli. Optimized growth conditions are shown. FIG. 3A shows the expression construct used. Leaky expression from the T7 promoting system caused toxic protein effects leading to mutations in gene sequence. Switching to a tightly regulated promoter allowed proposed cloning of the gene FIG. 3B shows protein gel results at 4 hour fermentation. FIG. 3C shows protein gel results at overnight (O/N) fermentation. In each Coomassie stained protein gel: lane 0 protein ladder; lane 1 cell pellet; lane 2 supernatant; lane 3 flow through; lane 4 wash; lane 5 wash 2; lane 6 imidazole wash; lane 7 elution 1; lane 8 elution 2; lane 9 elution 3; lane 10 elution 4, lane 11 elution 5; lane 12 elution 6; lane 13 elution 7.

FIG. 4A shows the expression construct used. Protein expression in BL21 DE3 Clear Coli. Results shown in the protein gel (FIG. 4B). In the Coomassie stained protein gel: lane 0 protein ladder; lane 1 cell pellet; lane 2 supernatant; lane 3 flow through; lane 4 wash; lane 5 imidazole wash; lane 6 elution 1; lane 7 elution 2; lane 8 elution 3; lane 9 elution 4, lane 10 elution 5. Solubility of the enzyme was hindered when being expressed behind a T7 Promoter.

FIG. 5A shows the expression construct used. Protein expression in BL21 DE3 Clear Coli (FIG. 5C). In the Coomassie stained protein gel: lane 0 protein ladder; lane 1 cell pellet; lane 2 supernatant; lane 3 flow through; lane 4 wash 1; lane 5 wash 2; lane 6 imidazole wash; lane 7 elution 1; lane 8 elution 2; lane 9 elution 3; lane 10 elution 4, lane 11 elution 5. Solubility of the enzyme was hindered when being expressed behind a T7 Promoter. Switching to the tightly regulated promoter and slowing down expression (18° C.) improved solubility.

FIGS. 6A and 6B: Addition of arabinose promoter enables growth and expression of insoluble Poly(A) Polymerase in BL21 DE3 Clear Coli. FIG. 6A shows the expression construct used. In the Coomassie stained protein gel (FIG. 6B): lane 0 protein ladder; lane 1 cell pellet; lane 2 supernatant; lane 3 flow through; lane 4 wash 1; lane 5 wash 2; lane 6 imidazole wash; lane 7 elution 1; lane 8 elution 2; lane 9 elution 3; lane 10 elution 4, lane 11 elution 5. Overexpressed protein is around 43 kD. Protein expression yielded a truncated enzyme with no solubility.

FIGS. 7A and 7B: Poly(A) Polymerase gene with UUG start codon enabled expression of protein with proper size and good solubility. Expression in BL21 DE3 Clear Coli. FIG. 7A shows the expression construct used. FIG. 7B western blot using anti-His. Lane 0 protein ladder; lane 1 cell pellet; lane 2 supernatant; lane 3 flow through; lane 4 wash 1; lane 5 wash 2; lane 6 imidazole wash; lane 7 elution 1; lane 8 elution 2; lane 9 elution 3. Protein expression yielded a truncated enzyme with no solubility. Addition of an unusual start codon and transcriptional regulation sequence allowed proper expression of enzyme.

FIGS. 10A and 10B: Performance comparison of improved, Clear Coli-expressed versus commercial In Vitro Transcription enzymes. Transfection result of IVT GFP-mRNAs produced using different enzymes. FIG. 10A shows the average GFP positive percentage. FIG. 10B shows the average geometric mean fluorescence intensity. In each graph, RNA sample is as follows: (1) unstranfected 293t; (2) in vitro transcript without modifications; (3) in vitro transcript with 5' cap; (4) uncapped HiScribe transcript with tail; (5) HiScribe transcript capped with ARCA; (6) HiScribe transcript capped with NEB VVCE; (7) mRNA transcript produced with in house enzymes (arrow).

DETAILED DESCRIPTION

Figure 1:
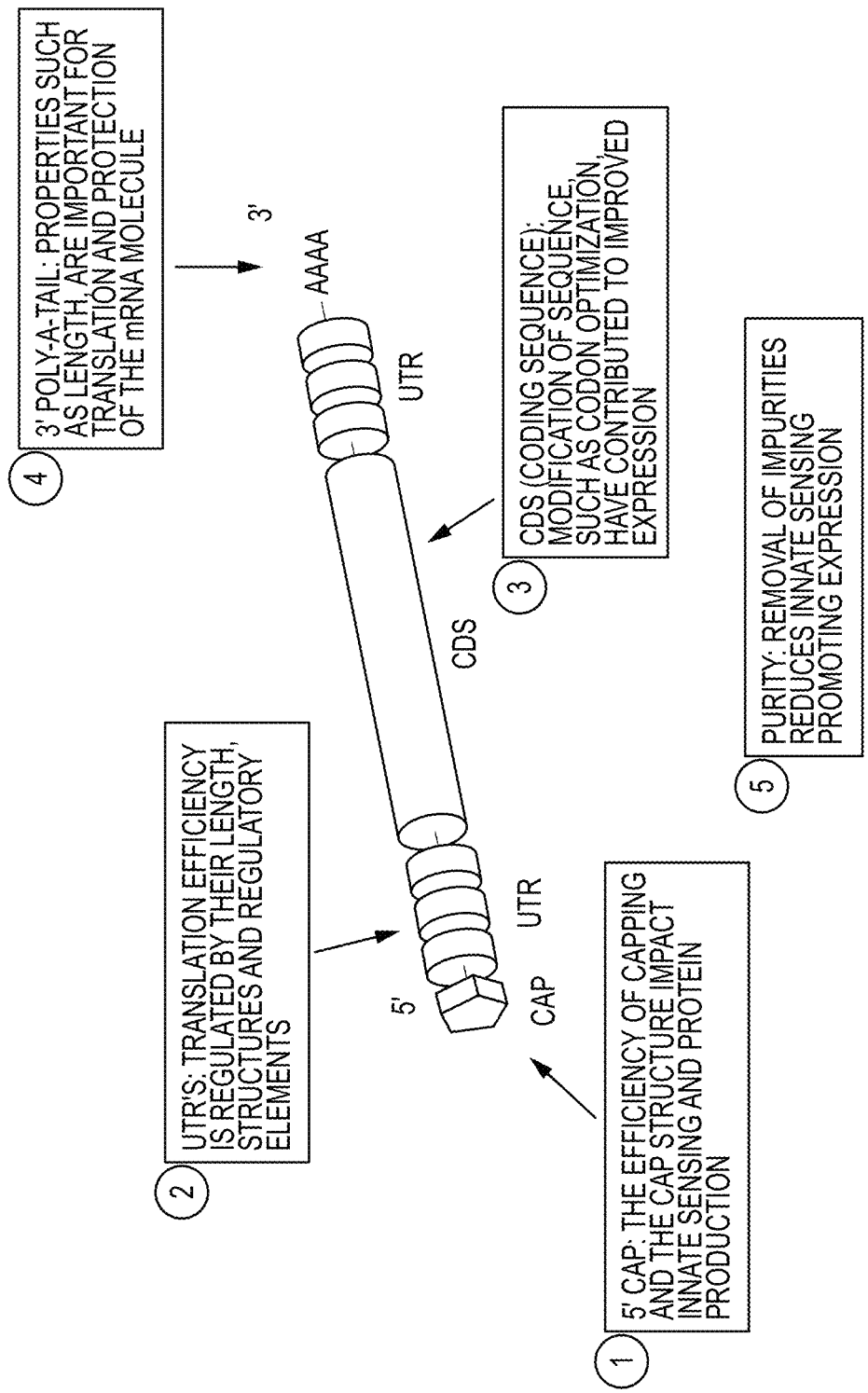
FIG. 1 depicts structural features of mRNA. Figure from Vaccines (2020) 5:11. The critical quality attributes dictating mRNA expression performance are shown. Five critical quality attributes are identified that dictate efficient expression of a gene of interest. Three of these attributes require the use of enzymes: transcription (T7 RNA polymerase); capping (Guanylyltransferase); and Poly(A) tailing (Poly(A) polymerase). As of now, these three core enzymes need to be purchased for IVT.
Figure 2:
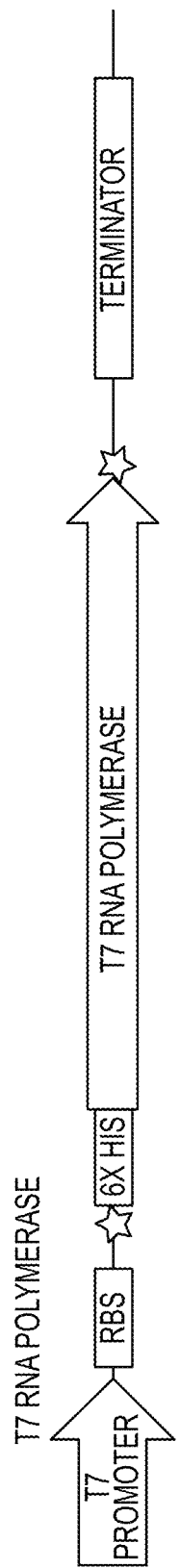
FIG. 2: T7 polymerase expression construct. Leaky expression from the T7 promoting system caused toxic protein effects leading to mutations in gene sequence. Switching to a tightly regulated promoter allowed proposed cloning of the gene.
Figure 3A:
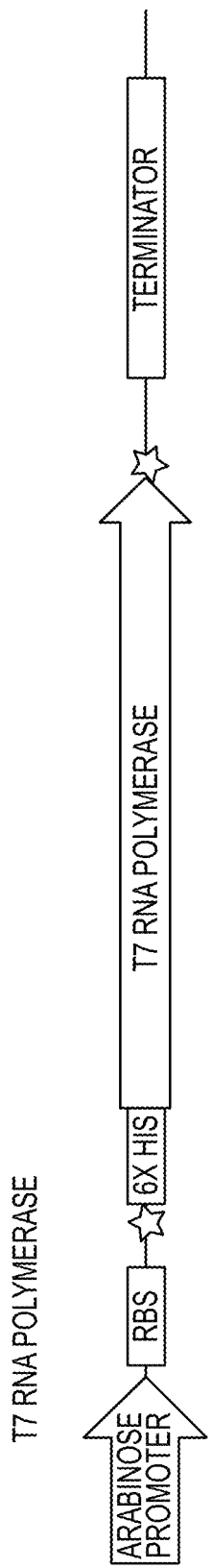
Figure 4A:
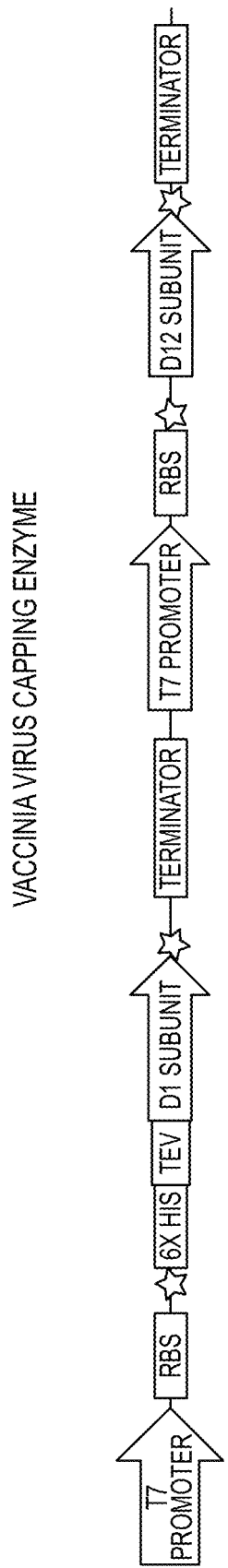
FIGS. 4A and 4B: Demonstration of poor VVCE solubility when being expressed behind a T7 Promoter.
Figure 4B:
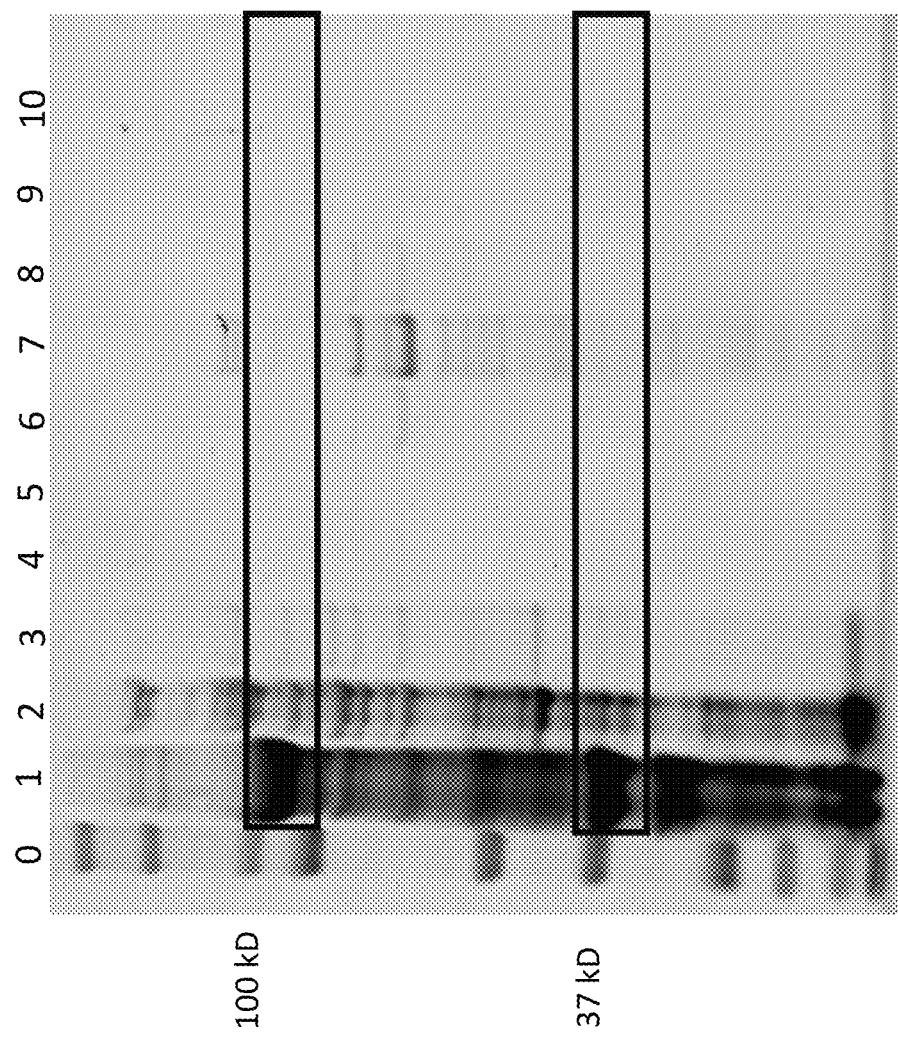
Figure 5A:
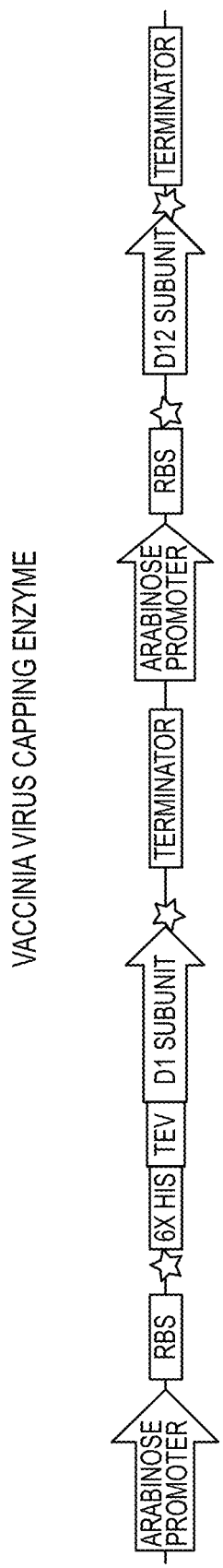
FIGS. 5A and 5B: Improved solubility of VVCE D1 and D12 subunits when T7 promoters are replaced with arabinose promoters.
Figure 5B:
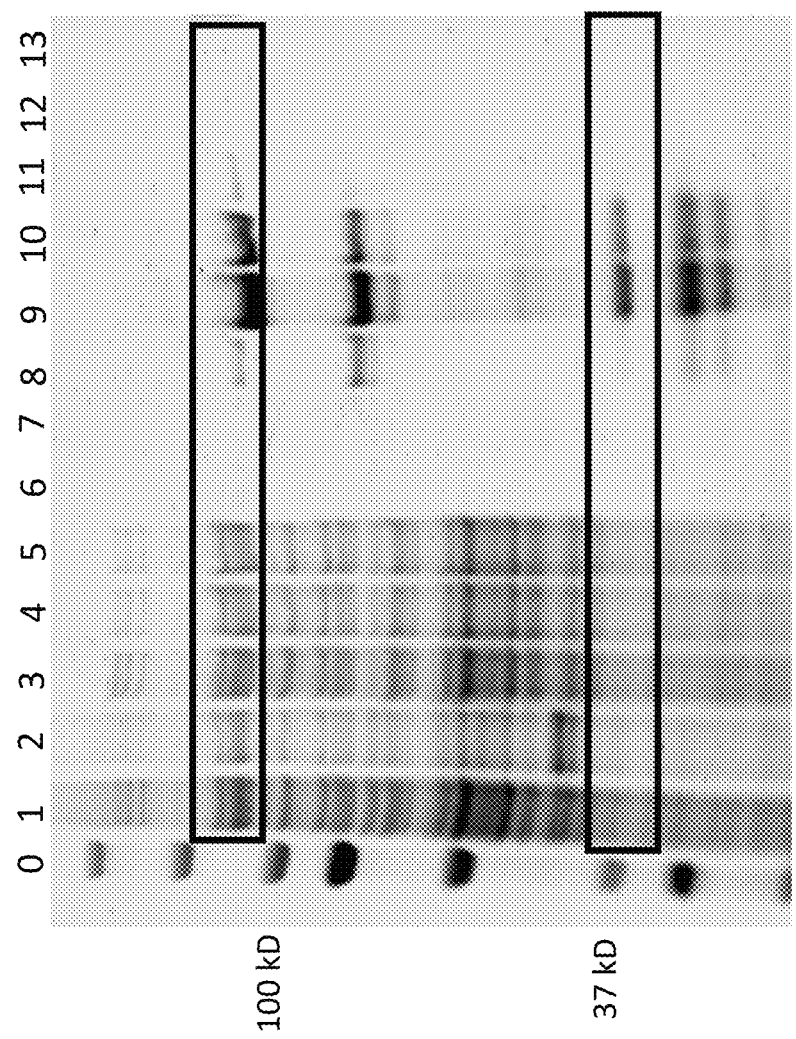
Figure 6A:
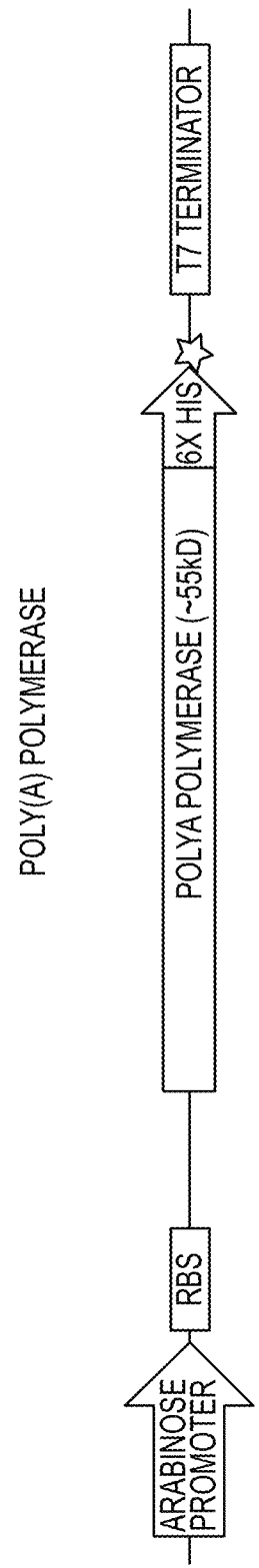

The disclosed components, compositions, systems, kits, and methods may be utilized for performing cell-free messenger RNA (mRNA) synthesis. Cell-free mRNA synthesis using in vitro transcription (IVT) exploits an ensemble of catalytic proteins prepared from the lysates of transfected bacterial cells. The purified proteins comprise an essential component of IVT reactions. A variety of methods exist for preparing proteins competent for cell-free mRNA synthesis, including those described herein.

All patents and published applications identified herein are incorporated by reference to the same extent as if each individual patent or application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Definitions

In some embodiments, the numbers expressing quantities of ingredients, properties such as concentration, reaction conditions, and so forth, used to describe and claim certain embodiments are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments are approximations, the numerical values set forth in the specific examples are reported as precisely as practicable. The numerical values presented in some embodiments may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided with respect to certain embodiments herein is intended merely to illuminate and does not pose a limitation on the scope of the claimed invention. No language in the specification should be construed as indicating any non-claimed element essential to the practice of the claimed invention.

Groupings of alternative elements or embodiments disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Expression vectors

Expression vectors containing a nucleic acid encoding one or more mRNAs described herein are provided. As used herein, the term "vector" refers to a nucleic acid molecule capable of transporting another nucleic acid to which it has been linked. One type of vector is a "plasmid," which refers to a circular double stranded DNA loop into which additional DNA segments can be ligated. Such vectors are referred to herein as "expression vectors." In general, expression vectors of utility in recombinant DNA techniques are often in the form of plasmids. In the present specification, "plasmid" and "vector" can be used interchangeably. However, the disclosed methods and compositions are intended to include such other forms of expression vectors, such as viral vectors (e.g., replication defective retroviruses, adenoviruses and adeno-associated viruses), which serve equivalent functions.

Messenger RNA

A surprising increase in mRNA quality, as determined by the expression levels of proteins expressed in mRNA trans-fected cells, results when commercially purchased enzymes T7 RNA polymerase, VVCE, and poly(A) polymerase were replaced with enzymes produced in-house in the mRNA production process. Enzyme production involves transfection of bacteria with plasmid expression vectors wherein the gene encoding a protein of interest is operably linked to a promoter sequence which drives expression of the transfected gene. FIG. 1 shows the key attributes of mRNA.

The promoter sequence may be any promoter suitable for driving protein expression in bacteria. In a preferred embodiment, the promoter is an arabinose promoter. Further engineering of genetic sequences inserted into the plasmid expression vector include the use of a tag by which a protein may be identified and/or purified. In a preferred embodiment, the gene encoding the protein of interest is linked to a sequence encoding a polymeric histidine (His) tag in-frame at either the 5' or the 3' end of the protein. The His tag may be separated from the gene of interest by a tobacco etch virus (TEV) protease recognition sequence, whereby TEV can be added to the protein to cleave off the His tag.

Replacement of the T7 promoter with an arabinose promoter driving expression of T7 RNA polymerase (FIG. 2 and FIGS. 3A-3C) was shown to enable growth of BL21 DE3 Clear Coli cells, and to drive heterologous protein expression therein. Increasing time of fermentation from 4 hours to overnight (18 hours) also increased protein expression. Similar replacement of T7 promoters driving expression the D1 and D12 subunits of VVCE with arabinose promoters enabled expression of the subunits (FIGS. 4A-4B and FIGS. 5A-5B). Performing the protein expression at 18° C. also improved protein expression.

A sequence for the production of an IVT protein may further be modified by the addition of an alternative start codon to the protein encoding sequence. In a preferred embodiment, an alternative start codon is linked to the N-terminus of poly(A) polymerase. This unusual UUG start codon of poly(A) polymerase was first postulated in Cao & Sarkar (Proc. Natl. Acad. Sci. USA. Vol. 89, pp. 10380-10384, November 1992). An N-terminal sequence (SEQ ID NO: 21) comprising the UUG start codon is encoded in-frame immediately upstream of the lysine at amino acid position 11 with respect to the wild type protein sequence of SEQ ID NO:25.

An expression plasmid insert sequence for the production of an IVT protein may further be modified by the use of novel promoter sequences. Surprisingly, an arabinose promoter significantly enhances the solubility of VVCE, and hence the yield of VVCE expressed in *E. coli*. Also surprising, the cloning itself of the T7 RNA polymerase and Poly(A) polymerase genes into expression vectors was enabled by placing an arabinose promoter upstream of the start codon of both proteins, as the use of a T7 promoter upstream of T7 RNA polymerase and poly(A) polymerase resulted in an inability to generate clonal expression plasmids which could successfully propagate in bacteria by standard techniques.

Figure 7A:
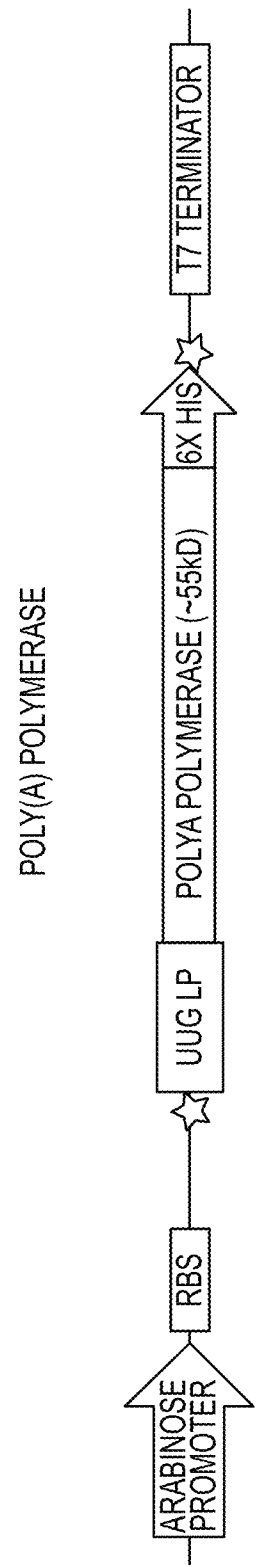

Disclosed herein are methods by which production of T7 RNA polymerase is optimized with respect to protein yield. After transfecting the expression plasmids into BL21 DE3 Clear Coli, the temperature of fermentation was reduced to 18° C. and the time was extended to 18 hours. FIG. 7 shows an increase in the yield of soluble T7 RNA polymerase when these fermentation conditions were applied.

Expression vectors containing a nucleic acid encoding one or more mRNAs described herein are provided. As used herein, the term "vector" refers to a nucleic acid molecule capable of transporting another nucleic acid to which it has been linked. One type of vector is a "plasmid," which refers to a circular double stranded DNA loop into which additional DNA segments can be ligated. Such vectors are referred to herein as "expression vectors." In general, expression vectors of utility in recombinant DNA techniques are often in the form of plasmids. In the present specification, "plasmid" and "vector" can be used interchangeably. However, the disclosed methods and compositions are intended to include such other forms of expression vectors, such as viral vectors (e.g., replication defective retroviruses, adenoviruses and adeno-associated viruses), which serve equivalent functions.

Having optimized the production of T7 RNA polymerase, VVCE, and poly(A) polymerase in bacteria, and having purified and characterized the proteins by standard methods, the proteins were applied in a sequential series of reactions whereby a linearized plasmid DNA containing a gene of interest is transcribed, capped, and a poly-adenosine tail is added. The plasmid into which the DNA has been inserted may be appropriate for propagation in viruses, prokaryotes, or eukaryotes.

Template DNA typically is propagated and stored as supercoiled plasmid DNA. Plasmid DNA is linearized through the action of one or more restriction enzymes, whereby the gene of interest is removed, or excised from the circular plasmid DNA. Typically unique restriction sites occur at the 5' and 3' ends of the gene of interest. The restriction sites may be the same or different. Any restriction enzymes can be used provided they do not recognize restriction sites within the gene of interest. The linearized DNA is then isolated via column purification, although other standard methods such as ethanol or isopropanol precipitation may be used. The purified linearized DNA comprising the gene sequence is then isolated by size determination and quantitated spectrophotometrically. One µG template DNA is then added to a reaction comprising nucleotide triphosphates (ATP, CTP, GTP, and UTP) and the purified T7 RNA polymerase. The reaction proceeds overnight at 37° C. in a thermal cycler. The RNA transcript is then column purified and quantitated via spectrophotometry.

Conversion of an RNA transcript to cap 0 RNA requires three sequential enzymatic steps: the removal of the 5' terminal g-phosphate by RNA triphosphatase activity (TPase), the transfer of a GMP group to the resultant diphosphate 5' terminus by RNA guanylyltransferase activity (GTase) and the modification of the N7 amine of the guanosine cap by guanine-N7methyltransferase activity (MTase). Vaccinia Virus capping enzyme consists of D1 and D12 subunits, with all three enzymatic steps performed by the D1 subunit. The purified and quantitated RNA transcript (10 µg) is then added into a reaction comprising GTP, s-adenosyl methionine, and purified VVCE. The reaction then proceeds at 37° C. for one hour. The capped RNA is then column purified and spectrophotometrically quantitated.

Polyadenylation is the addition of a poly(A) tail to an mRNA transcript. The poly(A) tail is important for the nuclear export, translation and stability of mRNA. The final step in the in vitro production of mRNA is the addition of a poly(A) tail to the capped transcript. The capped mRNA (10 µg) transcript is added to a reaction comprising ATP and purified poly(A) polymerase, and the reaction proceeds for one hour at 37° C. The capped, polyadenylated mRNA transcript is then column purified and spectrophotometrically quantitated. The purified mRNA should be used immediately or frozen at −80 C or below.

Figure 8:
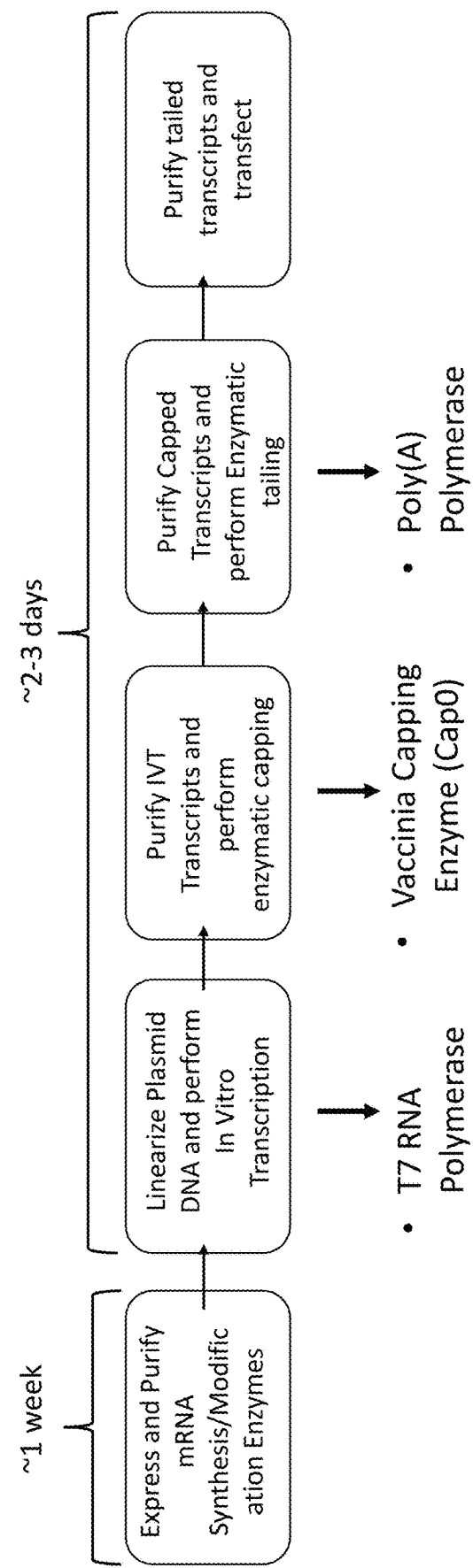
FIG. 8: Transfection ready mRNA production workflow.
Figure 9A:
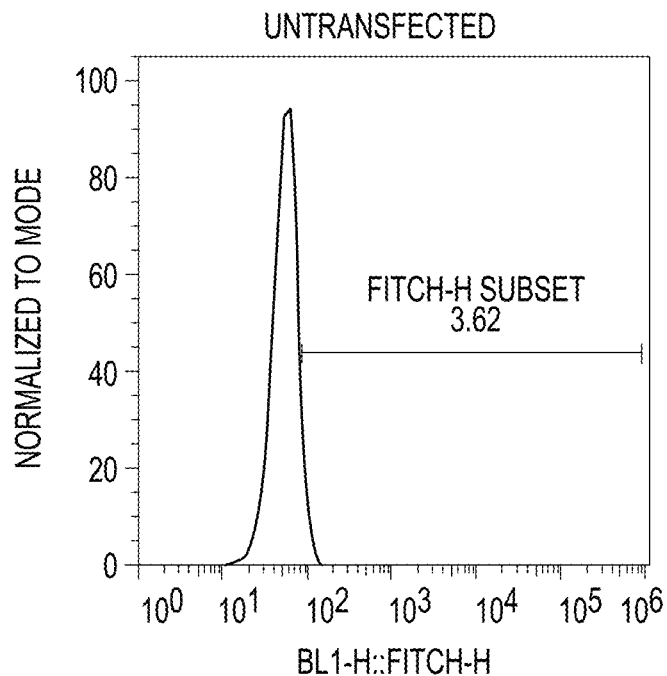
FIGS. 9A, 9B, 9C, 9D, 9E, and 9F: Flow Cytometry histogram analysis. Performance comparison of improved, Clear Coli-expressed versus commercial In Vitro Transcription enzymes. Detection of GFP expression in 293T Cells transfected with IVT GFP-mRNAs is shown in the plots. Plot shown is representative of triplicates.
Figure 9B:
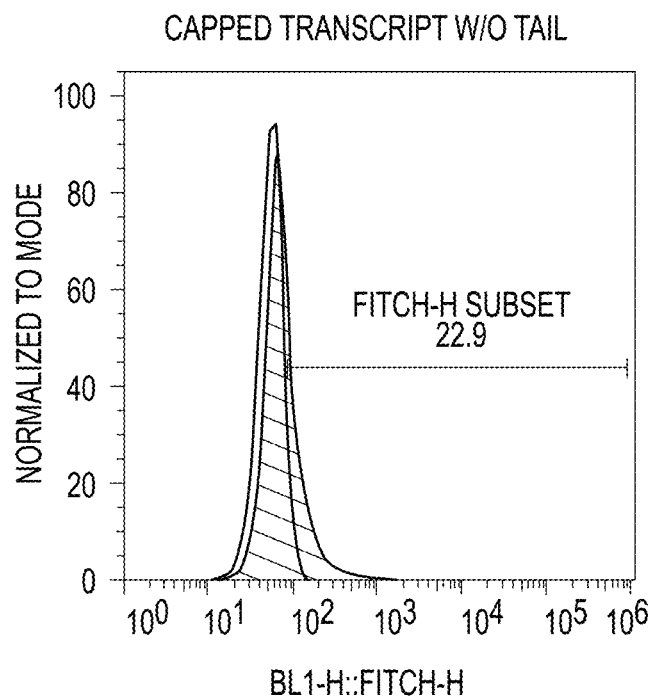
Figure 9C:
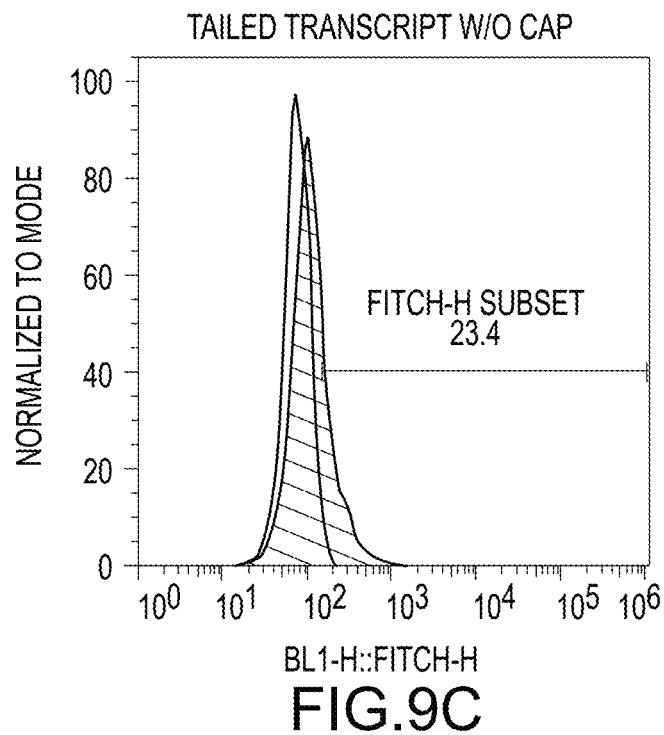
Figure 9D:
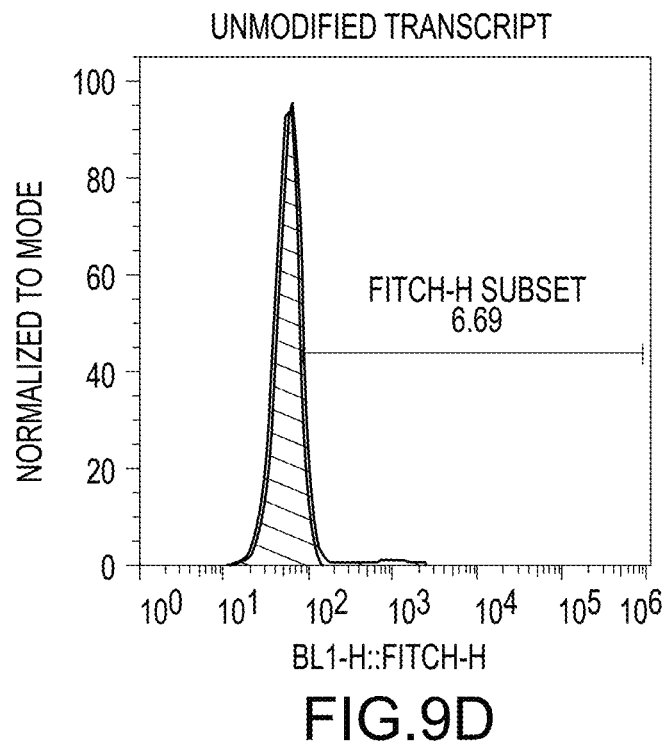
Figure 9E:
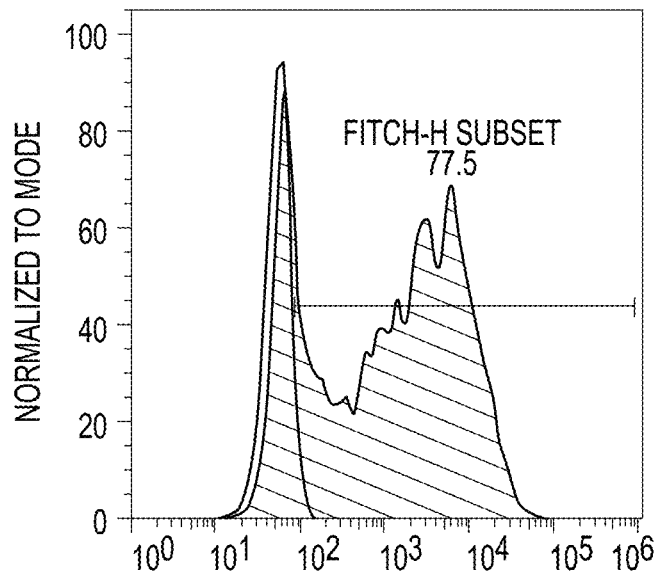
Figure 9F:
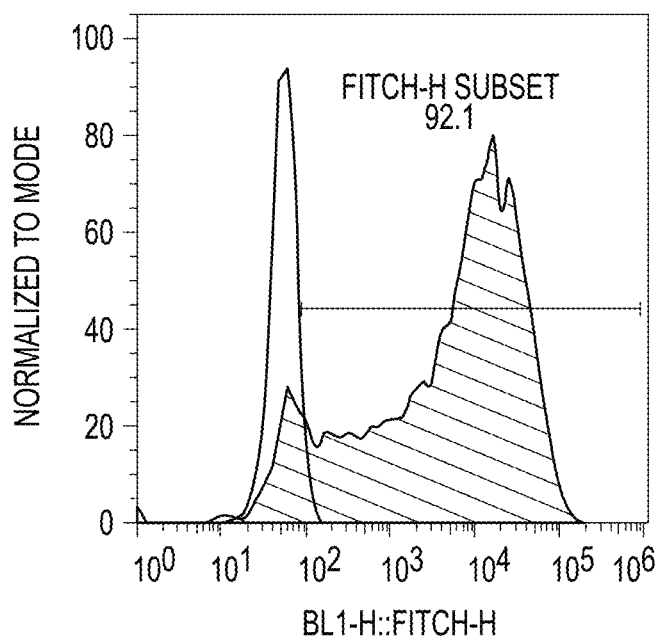
Figure 10A:
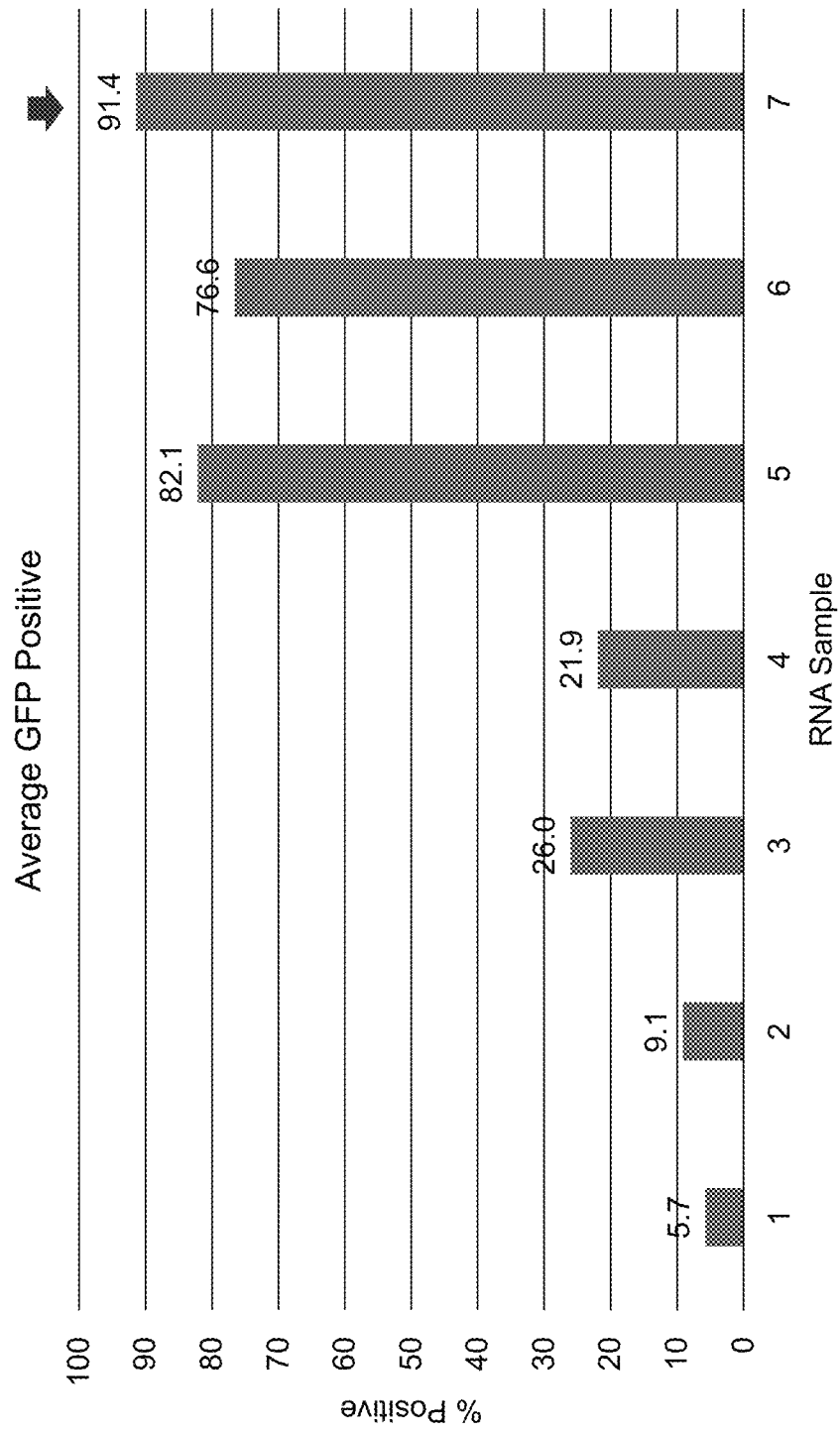

A summary of the mRNA workflow is shown in FIG. 8. mRNA derived thereby may be formulated for delivery to cells (in vitro transfection) or tissues (in vivo transfection). Any suitable formulation may be used. An exemplary nanoparticle formulation is described in U.S. Ser. No. 16/622,908, the contents of which are hereby incorporated by reference. Evaluation of delivery and expression of mRNA encoded proteins using standard methods, as presented in FIGS. 9A-9F wherein HEK293 cells are transfected and assessed via flow cytometry. FIGS. 10A and 10B show improved protein yield with mRNA produced by the methods described herein over commercially available RNA transcripts capped with commercially available VVCE protein from NEW ENGLAND BIOLABS®.

One should appreciate that the disclosed techniques provide many advantageous technical effects including increased production of IVT core proteins T7 RNA polymerase, Vaccinia Virus Capping Enzyme, and poly(A) polymerase, as well as increased yield of protein products derived from mRNA transcripts produced thereby.

EXAMPLES

Preparation of Arabinose Promoter Insert. pBAD-DEST49 DNA plasmid was used as template for the PCR used to amplify the arabinose promoter. SEQ ID NO:1 (forward) and SEQ ID NO:2 (reverse) primers were used to amplify the arabinose promoter. The amplification mix comprised (per reaction): 10 µL of 5×PRIMESTAR® GXL Polymerase Buffer; 4 µL DNTPs; 1 of 10 µM Forward Primer; 1 µL of 10 µM Reverse Primer; 50 ng of pBAD-DEST49; 1 µL of PRIMESTAR® GXL Polymerase; and MILLI-Q® water to a final volume of 50 µL. The following conditions were used for the amplification of the Arabinose insert: 98° C. for 2 minutes; 98° C. for 20 seconds (×30 cycles); 55° C. for 15 seconds (×30 cycles); 68° C. for 90 seconds (×30 cycles); and 68° C. for 1 minute. The PCR product was purified using QIAQUICK® PCR spin columns.

Purified PCR products were then used in another PCR using primers SEQ ID NOs: 3 and 4. The amplification mix comprised (per reaction): 10 µL of 5×PRIMESTAR® GXL Polymerase Buffer; 4 µL DNTPs; 1 µL of 10 µM Forward Primer; 1 µL of 10 µM Reverse Primer; 50 ng of pBAD-DEST49; 1 µL of PRIMESTAR® GXL Polymerase; MILLI-Q® water to a final volume of 50 µL. The following conditions were used for the amplification of the Arabinose insert: 98° C. for 2 minutes; 98° C. for 20 seconds (×30 cycles); 60° C. for 15 seconds (×30 cycles); 68° C. for 90 seconds (×30 cycles); and 68° C. for 1 minute. Arabinose promoter insert with Gibson assembly handles was then gel extracted and purified using the QIAGEN® Gel Extraction kit.

BglIII Restriction Digest Protocol. pET22b Lactose induced expression system was digested using BglIII restriction enzyme purchased from NEW ENGLAND BIOLABS®. Two separate reactions were completed for a pET22b and BglIII restriction digest as follows (per reaction): 10 µL of Buffer 3.1; 3 µL BglIII restriction enzyme; 46 µL pET22b DNA; 41 µL of MILLI-Q® Water. Each reaction was then incubated in a thermal cycler at 37° C. for 2 hours. Following incubation, 500 µL of Buffer PB was added to each reaction. Buffer PB and Restriction digest mixture was added to two separate mini prep columns purchased from QIAGEN®. Columns were spun for 1 minute at 15000×g and flow-through was discarded. 1 mL of Buffer PE containing Ethanol was added to each column. Columns were again spun for 1 minute at 15000×g and flow-through was discarded. Columns were spun dry for 2 minutes at 15000×g. Columns then transferred to new microcentrifuge tubes. 50 µL of MILLI-Q® Water were added to each column and spun for 2 minutes at 15000×g.

Xba1 Restriction Digest Protocol. 50 µL of the purified and digested material was used in the digest using Xba1 with the following protocol (per reaction): 9 µL of CUTSMART® Buffer; 3 µL of Xba1; 50 µL of BglIII digested Material; and 28 µL of MILLI-Q® Water. Reactions were incubated in a thermal cycler at 37° C. for 2 hours. Antarctic Phosphatase was then added (10 µL/reaction of Antarctic Phosphatase Buffer & 2 µL/reaction of Antarctic Phosphatase). The reaction mixtures were then incubated at 37° C. for 1 hour. The digested vector was gel extracted and purified using the QIAGEN® gel extraction purification kit.

GIBSON ASSEMBLY® Protocol. 100 ng of the digested and purified vector was prepared for the reaction. 70 ng of the amplified and purified promoter was also prepared for the reaction. Each reaction contained only 0.1 pmols of total DNA used in the GIBSON ASSEMBLY®. Vector DNA and Insert DNA were mixed with MILLI-Q® water to a final volume of 10 µL. 10 µL of 2×NEB HIFI Assembly Master mix (obtained from NEW ENGLAND BIOLABS®) was then added to the reaction mixture. The prepared GIBSON ASSEMBLY® reactions were then incubated in a thermal cycler at 50° C. for 15 minutes. Following the incubation period, 8 µL of the reaction mixture were then transformed using NEB5α ultracompetent cells. Transformed cells with the arabinose promoter cloned into the pET22b expression plasmid were used to amplify the plasmid DNA which was then harvested using the QIAGEN® Maxi Prep Purification system.

Cloning of pBM100 for creation of T7 RNA Polymerase expression system. The RNA polymerase with the Gibson handle as well as the incorporated 6×His tag was PCR amplified using SEQ ID NOs: 5 and 6 as primers. The PCR reaction mixture comprised (per reaction): 10 µL of 5×PRIMESTAR® GXL Polymerase Buffer; 4 µL DNTPs; 1 µL of 10 µM Forward Primer; 1 µL of 10 µM Reverse Primer; 50 ng of RNA Polymerase DNA; and 1 µL of PRIMESTAR® GXL Polymerase. The PCR to amplify the RNA Polymerase insert was completed as follows: 98° C. for 2 minutes; 98° C. for 20 seconds (×30 cycles); 60° C. for 15 seconds (×30 cycles); 68° C. for 120 seconds (×30 cycles); and 68° C. for 1 minute. The completed PCR was then purified using QIAQUICK® PCR spin columns. 20 µg of pBM98 was used in a double restriction digest using the enzymes: Nde1 and Nco1-HF using the following reaction recipe (per reaction): 90 µL of CUTSMART® buffer; 1 µL of Nco1-HF; 1 µL of Nde1; 20 µg of RNA Polymerase DNA; and water to a final volume of 90 µL. The restriction digest was then incubated in a thermal cycler for 2 hours at 37° C. Antarctic Phosphatase was then added (10 µL/reaction of Antarctic Phosphatase Buffer and 2 µL/reaction of Antarctic Phosphatase). The reaction mixture was then incubated at 37° C. for 1 hour. The digested vector was then gel extracted and purified using the QIAGEN® gel extraction purification kit.

100 ng of the digested and purified vector was prepared for a GIBSON ASSEMBLY® reaction. 126 ng of the amplified and purified RNA Polymerase insert was also prepared for the reaction. No more than 0.1 pmols of total DNA was used in each GIBSON ASSEMBLY® reaction. Vector DNA and Insert DNA were mixed with MILLI-Q® water to a final volume of 10µ. 10 µL of 2×NEB HIFI Assembly Master mix (obtained from NEW ENGLAND BIOLABS®) was then added to each reaction mixture. The prepared GIBSON ASSEMBLY® reactions were incubated in a thermal cycler at 50° C. for 15 minutes. Following the incubation period, 8 µL of the reaction mixture were then transformed using NEB5α ultracompetent cells. Transformed cells with the T7 RNA Polymerase cloned into the Arabinose Promoted expression plasmid were used to amplify the plasmid DNA which was then harvested using the QIAGEN® Mini Prep Purification system.

Creation of Dual Arabinose Promoting Expression Plasmid. The dual expressing arabinose promoting system was created for cloning of the Vaccinia Virus Capping Enzyme D1, and D12 subunits. pET-Duet purified plasmid was digested with Xba1 using the following protocol (per reaction): 9 µL of CUTSMART® Buffer; 3 µL of Xba1; 10 µg pET-Duet plasmid; MILLI-Q® water to a final volume of 90 µL. Reactions were incubated in a thermal cycler at 37° C. for 2 hours. Antarctic Phosphatase was then added (10 µL/reaction of Antarctic Phosphatase Buffer & 2 µL/reaction of Antarctic Phosphatase). Reaction mixture was then incubated at 37° C. for 1 hour.

The digested vector was then gel extracted and purified using the QIAGEN® gel extraction purification kit. The arabinose promoter insert was then amplified out of pBM98 using SEQ ID NOs: 1 and 2 as the primers, with the following reaction mixtures (per reaction): 10 µL of 5×PRIMESTAR® GXL Polymerase Buffer; 4 µL DNTPs; 1 µL of 10 µM Forward Primer; 1 µL of 10 µM Reverse Primer; 50 ng of pBM98; 1 µL of PRIMESTAR® GXL Polymerase; and MILLI-Q® water to a final volume of 50 µL. The following conditions were used for the Amplification of the Arabinose insert: 98° C. for 2 minutes; 98° C. for 20 seconds (×30 cycles); 55° C. for 15 seconds (×30 cycles); 68° C. for 90 seconds (×30 cycles); and 68° C. for 1 minute. The PCR product was purified using QIAQUICK® PCR spin columns.

Purified PCR products were then used in another PCR using SEQ ID NOs: 7 and 8 as primers. This PCR product was used for the GIBSON ASSEMBLY® in order to create the Multiple cloning site #1 with the arabinose promoting system. 100 ng of the digested and purified vector was prepared for a GIBSON ASSEMBLY® reaction. 70 ng of the amplified and purified promoter was also prepared for the reaction. No more than 0.1 pmols of total DNA was used in the GIBSON ASSEMBLY®. Vector DNA and Insert DNA were mixed with MILLI-Q® water to a final volume of 10 µL. 10 µL of 2×NEB HIFI Assembly Master mix (obtained from NEW ENGLAND BIOLABS®) was then added to the reaction mixture. The prepared GIBSON ASSEMBLY® reactions were then incubated in a thermal cycler at 50° C. for 15 minutes. Following the incubation period, 8 µL of the reaction mixture were then transformed using NEB5α ultracompetent cells. Transformed cells with the arabinose promoter cloned into the pET-Duet dual expression plasmid were used to amplify the plasmid DNA which was then harvested using the QIAGEN® Midi Prep Purification system. The resulting plasmid was labeled as pBM122 to denote the presence of an arabinose promoter in MCS1 and a T7 promoter in the MCS2.

The newly constructed plasmid was then used to replace the downstream T7 promoter with another arabinose promoting insert. A dual restriction digest was complete on the prepared plasmid using the enzymes Bsrg1-HF and Nde1 with the following reaction mix (per reaction): 9 µL of CUTSMART® Buffer; 1.5 µL of Bsrg1-HF; 1.5 µL of Nde1; 30 µg of pBM122; and MILLI-Q® water to a final volume of 90 µL.

Restriction digests were incubated at 37° C. for 1 hour. Antarctic Phosphatase was then added (10 µL/reaction of Antarctic Phosphatase Buffer & 2 µL/reaction of Antarctic Phosphatase). Reaction mixture was then incubated at 37° C. for 1 hour. The digested vector was then gel extracted and purified using the QIAGEN® gel extraction purification kit. The arabinose promoter was prepared with SEQ ID NOs: 1 and 2 as primers. PCR was completed using the following protocol (per reaction): 10 µL of 5×PRIMESTAR® GXL Polymerase Buffer; 4 µL DNTPs; 1 µL of 10 µM Forward Primer; 1 µL of 10 µM Reverse Primer; 50 ng of pBM98; 1 µL of PRIMESTAR® GXL Polymerase; and MILLI-Q® water to a final volume of 50 µL. The following conditions were used for the Amplification of the Arabinose insert: 98° C. for 2 minutes; 98° C. for 20 seconds (×30 cycles); 55° C. for 15 seconds (×30 cycles); 68° C. for 90 seconds (×30 cycles); and 68° C. for 1 minute. The PCR product was purified using QIAQUICK® PCR spin columns.

Purified PCR products were then used in another PCR amplification with primers SEQ ID NOs: 9 and 10. Each PCR reaction comprised: 10 µL of 5×PRIMESTAR® GXL Polymerase Buffer; 4 µL DNTPs; 1 µL of 10 µM Forward Primer; 1 µL of 10 µM Reverse Primer; 50 ng of the made PCR Product; 1 µL of PRIMESTAR® GXL Polymerase; and MILLI-Q® water to a final volume of 50 µL. The following conditions were used for the Amplification of the Arabinose insert: 98° C. for 2 minutes; 98° C. for 20 seconds (×30 cycles); 60° C. for 15 seconds (×30 cycles); 68° C. for 90 seconds (×30 cycles); and 68° C. for 1 minute. The PCR product was purified using QIAQUICK® PCR spin columns.

Purified PCR products were then used in another PCR using SEQ ID NOs: 9 and 10 as primers, in a reaction mixture comprising the follow (per reaction): 10 µL of 5×PRIMESTAR® GXL Polymerase Buffer; 4 µL DNTPs; 1 µL of 10 µM Forward Primer; 1 µL of 10 µM Reverse Primer; 50 ng of the made PCR Product; 1 µL of PRIMESTAR® GXL Polymerase; and MILLI-Q® water to a final volume of 50 µL. The following conditions were used for the Amplification of the Arabinose insert: 98° C. for 2 minutes; 98° C. for 20 seconds (×30 cycles); 60° C. for 15 seconds (×30 cycles); 68° C. for 90 seconds (×30 cycles); and 68° C. for 1 minute. The PCR product was purified using QIAQUICK® PCR spin columns.

100 ng of the digested and purified vector was prepared for a GIBSON ASSEMBLY® reaction. 58 ng of the amplified and purified promoter was also prepared for the reaction. No more than 0.1 pmols of total DNA were used in the GIBSON ASSEMBLY®. Vector DNA and Insert DNA were mixed with MILLI-Q® water to a final volume of 10 µL. 10 µL of 2×NEB HIFI Assembly Master mix (obtained from NEW ENGLAND BIOLABS®) was then added to the reaction mixture. The prepared GIBSON ASSEMBLY® reactions were then incubated in a thermal cycler at 50° C. for 1 hour. Following the incubation period, 8 µL of the reaction mixture were then transformed using NEB5α ultra-competent cells.

Transformed cells with the arabinose promoter cloned into the pET-Duet dual expression plasmid were used to amplify the plasmid DNA which was then harvested using the QIAGEN® Maxi Prep Purification system. The resulting plasmid was labeled as pBM123 to be used in cloning.

Cloning of pBM127, Vaccinia Virus Capping Enzyme in Dual Arabinose Promoting Expression System. SEQ ID NOs: 11 and 12 primers were used to amplify the D12 subunit for purposes of cloning into the second multiple cloning site of the arabinose promoting system in the following reaction mixture (per reaction): 10 µL of 5×PRIMESTAR® GXL Polymerase Buffer; 4 µL DNTPs; 1 µL of 10 µM Forward Primer; 1 µL of 10 µM Reverse Primer; 50 ng of D12 subunit Template; 1 µL of PRIMESTAR® GXL Polymerase; and MILLI-Q® water to a final volume of 50 µL. The following conditions were used for the Amplification of the D12 GIBSON ASSEMBLY® insert: 98° C. for 2 minutes; 98° C. for 20 seconds (×30 cycles); 55° C. for 15 seconds (×30 cycles); 68° C. for 90 seconds (×30 cycles); 55° C. for 15 seconds (×30 cycles); 68° C. for 120 seconds (×30 cycles); ad 68° C. for 1 minute. The PCR product was purified using QIAQUICK® PCR spin columns.

10 µg of pBM125 plasmid was digested using Nco1-HF restriction enzyme using the following reaction mixture (per reaction): 9 µL of CUTSMART® buffer; 2 µL of Nco1-HF; 10 of pBM125; and MILLI-Q® water to a final volume of 90 µL. Incubation was completed in a thermal cycler for 1 hour at 37° C. Antarctic Phosphatase was then added (10 µL/reaction of Antarctic Phosphatase Buffer & 2 µL/reaction of Antarctic Phosphatase). Reaction mixture was then incubated at 37° C. for 1 hour. The digested vector was then gel extracted and purified using the QIAGEN® gel extraction purification kit.

100 ng of the digested and purified vector was prepared for a GIBSON ASSEMBLY® reaction. 125 ng of the amplified and purified subunit was also prepared for the reaction. No more than 0.1 pmols of total DNA were used in the Gibson assembly. Vector DNA and Insert DNA were mixed with MILLI-Q® water to a final volume of 10 µL. 10 µL of 2×NEB HIFI Assembly Master mix (obtained from NEW ENGLAND BIOLABS®) was then added to the reaction mixture. The prepared GIBSON ASSEMBLY® reactions were then incubated in a thermal cycler at 50° C. for 15 minutes. Following the incubation period, 8 µL of the reaction mixture were then transformed using NEB5α ultra-competent cells. Transformed cells with the D12 subunit cloned in were used to amplify the plasmid DNA which was then harvested using the QIAGEN® Mini Prep Purification system. The resulting DNA was labeled as pBM127 and used for transformations into CLEARCOLI™ competent cells for protein expression.

Cloning of pBM135 for creation of E. coli Poly(A) Polymerase expression system. The PCR reaction mixture was prepared as follows with SEQ ID NOs: 15 and 16 as primers (volumes per reaction): 10 µL of 5×PRIMESTAR® GXL Polymerase Buffer; 4 µL DNTPs; 1 µL of 10 Forward Primer; 1 µL of 10 µM Reverse Primer; 50 ng of Poly(A) Polymerase DNA; 1 µL of PRIMESTAR® GXL Polymerase. The PCR to amplify the Poly(A) Polymerase insert was completed as follows: 98° C. for 2 minutes; 98° C. for 20 seconds (×30 cycles); 55° C. for 15 seconds (×30 cycles); 68° C. for 90 seconds (×30 cycles); and 68° C. for 1 minute. The completed PCR was then purified using QIAQUICK® PCR spin columns.

Purified PCR products were then used in another PCR with SEQ ID NOs: 17 and 18 as primers. PCR reactions were prepared as follows (per reaction): 10 µL of 5×PRIMESTAR® GXL Polymerase Buffer; 4 µL DNTPs; 1 µL of 10 µM Forward Primer; 1 µL of 10 µM Reverse Primer; 50 ng of the made PCR Product; 1 µL of PRIMESTAR® GXL Polymerase; and MILL-Q® water to a final volume of 50 The following conditions were used for the Amplification of the Poly(A) Polymerase insert: 98° C. for 2 minutes; 98° C. for 20 seconds (×30 cycles); 55° C. for 15 seconds (×30 cycles); 68° C. for 60 seconds (×30 cycles); 68° C. for 1 minute. The PCR product was purified using QIAQUICK® PCR spin columns.

20 µg of pBM98 was used in a double restriction digest using the enzymes: Nde1 and Nco1-HF using the following reaction recipe (per reaction): 90 µL of CUTSMART® buffer; 1 µL of Nco1-HF; 1 µL of Nde1; 20 µg of pBM98; and water to a final volume of 90 µL. The restriction digest was incubated in a thermal cycler for 2 hours at 37° C. Antarctic Phosphatase was then added (10 µL/reaction of Antarctic Phosphatase Buffer & 2 µL/reaction of Antarctic Phosphatase). Reaction mixture was then incubated at 37° C. for 1 hour. The digested vector was then gel extracted and purified using the QIAGEN® gel extraction purification kit.

100 ng of the digested and purified vector was prepared for a GIBSON ASSEMBLY® reaction. 63 ng of the amplified and purified Poly(A) Polymerase insert was also prepared for the reaction. No more than 0.1 pmols of total DNA were used in the GIBSON ASSEMBLY®. Vector DNA and Insert DNA were mixed with MILLI-Q® water to a final volume of 10 µL. 10 µL of 2×NEB HIFI Assembly Master mix (obtained from NEW ENGLAND BIOLABS®) was then added to the reaction mixture. The prepared GIBSON ASSEMBLY® reactions were then incubated in a thermal cycler at 50° C. for 15 minutes. Following the incubation period, 8 µL of the reaction mixture were then transformed using NEB5α ultracompetent cells.

Transformed cells with the *E. coli* Poly(A) Polymerase cloned into the Arabinose Promoted expression plasmid were used to amplify the plasmid DNA which was then harvested using the QIAGEN® Mini Prep Purification system.

Production of RNA Transcript from linearized DNA. This procedure is used for preparations of reactions for in vitro RNA transcript generation encoding a desired gene of interest for further downstream modifications. The list of equipment used in the process includes: 96 well thermal cycler; 10×transcription buffer; micropipette; NTPs (100 mM); 8-strip PCR tubes; inorganic pyrophosphatase; RNAse inhibitor (murine); Not1-HF enzyme; in-house purified T7 RNA polymerase; and QIAGEN® PCR Purification Kit.

To prepare the In Vitro Transcription (IVT) template, one obtains an aliquot of pRNI-GFP to prepare for restriction digest. 10 µg of template DNA were digested for every three IVT reactions being prepared using the following recipe (volumes per reaction): 5 µL of CUTSMART® Buffer; 2 of Not1-HF Restriction Enzyme; 10 µg of pRNI-GFP; nuclease free water to a final volume of 100 µL. Add the above contents into a 1.5 mL microcentrifuge tube labeled: Name: "pRNI-GFP Digest." Incubate in a 37° C. incubator for 2 hours. Following incubation, digested DNA was removed and 500 µL of Buffer PB was added. The mixture of Buffer PB and digested DNA was transferred to a purple QIAGEN® PCR Purification column. The column spun in a tabletop centrifuge at max speed for 1 minute and flowthrough was discarded. 750 µL of Buffer PE went directly to the column, followed by a spin in the centrifuge for 1 minute at max speed. Again, flowthrough was discarded. The column was then spun dry at max speed for 3 minutes. A 1.5 mL microcentrifuge tube was labeled: "Digested pRNI-GFP." The column went into the newly labeled microcentrifuge tube. 40 µL of nuclease free water was placed directly to the membrane. Following a 2 minute incubation at 37° C., the column was spun at max speed in centrifuge for 2 minutes. The elution fraction was analyzed using a spectrophotomer per manufacturer's instructions.

To prepare IVT reactions, one labels a PCR tube with the following: Name: "IVT Reaction." The following tubes were obtained and kept on ice at all times: vial of in-house purified T7 RNA polymerase; vial of inorganic pyrophosphatase; vial of RNAse inhibitor (murine); tube of "pRNI-GFP Digest." The following reagents were thawed at room temperature: 10×Reaction Buffer; ATP; CTP; UTP; and GTP. Add the following reagents into the labeled PCR tube in the following order: RNAse free water (<20 µL); 10×reaction buffer (2 µL); 100 mM ATP (2 µL); 100 mM CTP (2 µL); 100 mM GTP (2 µL); 100 mM UTP (2 µL); template DNA (1 µg); T7 RNA Polymerase Mix (2 µL); RNAse inhibitor (1 µL); inorganic pyrophosphatase (2 The final volume of one reaction should be 20 µL. The prepared PCR tube was briefly centrifuged, and then incubated at 37° C. in a thermal cycler overnight.

PURIFICATION OF IVT RNA TRANSCRIPTS. Following overnight incubation, the tubes were removed from thermal cycler and 100 µL of Buffer PB added to the reaction using a filtered p200 micropipette. It is typical at this point in the process that the reaction vessel will be cloudy following the overnight incubation. When adding Buffer PB there will be presence of translucent solid which should be mixed gently using the pipette.

The mixture was added directly to the membrane of a purple QIAGEN® PCR purification column. The column spun at max speed for 1 minute, and the flowthrough was discarded. 750 µL of Buffer PE was added to each column and spun at max for 1 minute. Flowthrough was discarded. The column spun dry at max speed for 3 minutes. A new 1.5 mL Microcentrifuge tube was labeled: "In Vitro Transcript." The column was moved into the labeled microcentrifuge tube and 35 µL of RNAse free water was added directly to the membrane. The column spun at max speed for 2 minutes. The eluted RNA transcript was then analyzed in a spectrophotometer per manufacturer's instructions. Following spectrophotometer analysis, the purified RNA transcript should be kept on ice.

If the Capping reaction cannot be completed directly after the purification, any RNA transcripts should be stored at −80° C. Frozen RNA should not be stored for more than 1 week for best results.

Production of Capped RNA Transcript. The following components were stored at −20° C. prior to the start of work and kept on ice during reaction assembly: 10×Capping Buffer, 32 mM S-adenosyl Methionine (SAM), 10 mM guanosine triphosphate (GTP), RNAse inhibitor (murine), in-house purified vaccinia virus capping enzyme (VVCE). A microcentrifuge tube was labeled: "2 mM SAM." SAM was diluted 1:16 by adding 30 µL of RNAse free water and 2 µL of the 32 mM stock into the labeled microcentrifuge tube. It is best to dilute SAM just prior to the reactions for highest capping efficiencies. Two new PCR strip tubes were labeled: "VVCE Capping Reaction." 10 µg of RNA were added to each labeled tube using the purified RNA collected. RNAse free water was added to a final volume of 14 µL for each tube. The RNA and water mixture was denatured at 65° C. for 5 minutes in the thermal cycler. Immediately post-denaturation, the RNA was placed on ice for 5 minutes. The reagents were added to each reaction in the following order (volumes per reaction): 2 µL of 10×Capping Buffer; 1 µL of 10 mM GTP; 1 µL of 2 mM SAM; 1 µL of VVCE; and 1 µL of RNAse inhibitor. The contents were mixed gently using a pipette and spun down. Reactions were incubated in a thermal cycler for 1 hour at 37° C.

Following the 37° C. incubation, the tubes were removed from the thermal cycler and 100 µL of Buffer PB was added to each reaction using a filtered p200 micropipette. The contents of each reaction tube were carefully moved onto the membrane of a purple QIAGEN® PCR purification column. The column was centrifuged at max speed for 1 minute, and the flowthrough discarded. 750 of Buffer PE was added to each column and spun at max for 1 minute. After discarding the flowthrough, the column was dried by spinning at max speed for 3 minutes. Two new 1.5 mL microcentrifuge tubes were labeled: "Capped RNA Transcript." The columns were placed in the labeled microcentrifuge tubes and 35 µL of RNAse free water was added directly to the membrane and incubated for 2 minutes. The product was collected by spinning the column at max speed for 2 minutes. The prepared RNA transcript was analyzed using the spectrophotomer per manufacturer's instructions. Following the SPEC, the purified RNA transcript was kept on ice and moved directly to the tailing reaction. If the tailing reaction cannot be completed directly after the purification, any RNA transcripts should be stored at −80° C. for the time being (no longer than 1 week for best results).

Production of poly-adenylated mRNA. The following components were stored at −20° C. prior to the start of work and kept on ice during reaction assembly: 10×Tailing Buffer; 10 mM adenosine triphosphate (ATP); RNAse inhibitor (murine); and in-house purified poly(a) polymerase. Two new PCR strip tubes were labeled: "Poly(A) Polymerase Tailing Reaction." 10 µg of RNA were added to each labeled tube using the purified RNA collected. RNAse free water was added to a final volume of 14 µL for each tube. The reagents were added to each reaction in the following order: 24, of 10×tailing Buffer; 24, of 10 mM ATP; 1 µL of poly(A) polymerase; and 1 µL of RNAse inhibitor. The contents were mixed gently using a pipette and spun down. Reactions were incubated in a thermal cycler for 1 hour at 37° C.

Following the incubation period, the tubes were removed from the thermal cycler and 100 µL of Buffer PB added to each reaction using a filtered p200 micropipette. The mixtures were directly added to the membrane of a purple QIAGEN® PCR purification column. The column was centrifuged at max speed for 1 minute, and the flowthrough discarded. 750 µL of Buffer PE was added to the column, followed by a spin at max for 1 minute. After discarding the flowthrough, the column was spun dry at max speed for 3 minutes. The column was placed in a new 1.5 mL microcentrifuge tube and 35 µL of RNAse free water added directly to the membrane. The column was allowed to sit for 2 minutes, and then spun at max speed for 2 minutes. The prepared RNA transcript was then analyzed using the spectrophotomer per manufacturer's instructions. Following the SPEC, the purified RNA transcript should be kept on ice and proceed directly to the Transfection reactions. If the transfections cannot be completed directly after the purification, any RNA transcripts should be stored at −80° C.

The following discussion provides many example embodiments. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the concepts herein. The present disclosure, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A method for in vitro synthesis of mRNA, the method comprising:

transfecting a first plurality of competent bacterial cells with a first plasmid vector comprising an arabinose promoter linked to a nucleic acid sequence encoding T7 RNA polymerase, wherein the first plasmid vector comprises a nucleotide sequence that is at least 95% identical to SEQ ID NO: 19;

transfecting a second plurality of competent bacterial cells with a second plasmid vector comprising at least one arabinose promoter linked to a nucleic acid sequence encoding vaccinia virus capping enzyme (VVCE), wherein the second plasmid vector comprises a nucleotide sequence that is at least 95% identical to SEQ ID NO: 20;

transfecting a third plurality of competent bacterial cells with a third plasmid vector comprising a UUG start codon, an arabinose promoter linked to a nucleic acid sequence encoding polyadenosine (poly (A)) polymerase, wherein the third plasmid vector comprises a nucleotide sequence that is at least 95% identical to SEQ ID NO: 21;

expressing and purifying T7 RNA polymerase from the first plurality of competent bacterial cells;

expressing and purifying VVCE from the second plurality of competent bacterial cells;

expressing and purifying poly (A) polymerase from the third plurality of competent bacterial cells;

adding linearized plasmid DNA to a first composition comprising the purified T7 RNA polymerase to produce RNA transcripts;

adding the RNA transcripts to a second composition comprising the purified VVCE to produce capped RNA transcripts;

adding the capped RNA transcripts to a third composition comprising the purified poly (A) polymerase to produce polyadenylated capped mRNA transcripts; and purifying mRNA from the third composition.

2. The method of claim 1, wherein the first plasmid vector comprises a nucleotide sequence that comprises SEQ ID NO: 19.

3. The method of claim 1, wherein the second plasmid vector comprises a nucleotide sequence that comprises SEQ ID NO: 20.

4. The method of claim 1, wherein the third plasmid vector comprises a nucleotide sequence that comprises SEQ ID NO: 21.

5. The method of claim 1, wherein the bacterial competent cells are *E. Coli* BL21 (DE3) competent cells.

6. The method of claim 1, wherein VVCE is expressed at 18° C.

7. The method of claim 1, wherein VVCE is expressed over an 18 hour fermentation period.

* * * * *